(12) United States Patent
Yokum et al.

(10) Patent No.: US 11,777,400 B2
(45) Date of Patent: *Oct. 3, 2023

(54) SWITCHING CONTROL IN ELECTRICAL LOAD CONTROLLERS

(71) Applicant: Leviton Manufacturing Co., Inc., Melville, NY (US)

(72) Inventors: Brian Anthony Yokum, New Orleans, LA (US); Ronald James Gumina, Mandeville, LA (US)

(73) Assignee: LEVITON MANUFACTURING CO., INC., Melville, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/049,348

(22) Filed: Oct. 25, 2022

(65) Prior Publication Data

US 2023/0072486 A1 Mar. 9, 2023

Related U.S. Application Data

(63) Continuation of application No. 17/325,164, filed on May 19, 2021, now Pat. No. 11,515,779.

(Continued)

(51) Int. Cl.
*H02M 5/293* (2006.01)
*H02M 1/08* (2006.01)
*H02M 1/00* (2006.01)

(52) U.S. Cl.
CPC ......... *H02M 1/083* (2013.01); *H02M 1/0058* (2021.05); *H02M 5/293* (2013.01)

(58) Field of Classification Search
CPC .... H02M 1/083; H02M 1/0058; H02M 5/293; H05B 47/10; H05B 41/392; H05B 45/32; H05B 39/044

See application file for complete search history.

(56) References Cited

U.S. PATENT DOCUMENTS

| | | |
|---|---|---|
| 4,894,621 A | 1/1990 | Koenig et al. |
| 5,020,026 A | 5/1991 | Schreck et al. |

(Continued)

FOREIGN PATENT DOCUMENTS

WO 2020068089 4/2020

OTHER PUBLICATIONS

International Search Report and Written Opinion for PCT/US2020/070109 completed Aug. 18, 2020, 15 pgs.

(Continued)

*Primary Examiner* — Adolf D Berhane
(74) *Attorney, Agent, or Firm* — Matthew M. Hulihan; Heslin Rothenberg Farley & Mesiti PC

(57) ABSTRACT

Operating an electrical load controller includes, in one aspect, detecting zero-crossings of an AC waveform, determining periods each corresponding to a full cycle of the AC waveform, determining a frequency of the AC waveform based on the determined periods, and controlling a supply of AC power to a load based thereon using the determined frequency to fire a switching circuit of the electrical load controller. In another aspect, a method includes maintaining a minimum on-time for which a control signal to the switching circuit is to remain in an ON state to fire the switching circuit; based on a desired load level setting of the electrical load controller, setting a corresponding control signal turn-on time to turn the control signal to the ON state to conduct the supply of AC power to the load, the control signal turn-on time corresponding to a firing angle of half cycles of the AC power; selecting a control signal turn-off time to turn the control signal to the OFF state, where the selecting is made between (i) a first turn-off time equal to the set turn-on time plus the minimum on-time, and (ii) a second turn-off time equal to a default turn-off time for turning the control signal to the OFF state, the control signal turn-off (Continued)

time corresponding to a second angle of half cycles of the AC power; and controlling the supply of AC power to the load by selectively controlling the switching circuit to conduct the supply of AC power to the load, the controlling the supply of AC power to the load including: based on turning the control signal to the ON state during a half cycle of the AC power at the set control signal turn-on time, holding the control signal in the ON state until the selected control signal turn-off time during the half cycle.

20 Claims, 10 Drawing Sheets

Related U.S. Application Data

(60) Provisional application No. 63/028,063, filed on May 21, 2020.

(56) References Cited

U.S. PATENT DOCUMENTS

| | | | |
|---|---|---|---|
| 6,380,692 | B1 | 4/2002 | Newman |
| 6,717,394 | B2 | 4/2004 | Elms |
| 8,324,761 | B2 | 12/2012 | Elliott et al. |
| 8,618,751 | B2 | 12/2013 | Ostrovsky et al. |
| 9,681,526 | B2 | 6/2017 | Ostrovsky et al. |
| 9,860,949 | B2 | 1/2018 | Tyson et al. |
| 9,974,152 | B2 | 5/2018 | Ostrovsky et al. |
| 10,251,228 | B1 | 4/2019 | Lester et al. |
| 11,301,013 | B2 | 4/2022 | Bull |
| 11,464,096 | B2 * | 10/2022 | Ostrovsky ............ H05B 39/048 |
| 11,515,779 | B2 * | 11/2022 | Yokum ................ H02M 1/081 |
| 2002/0070719 | A1 | 6/2002 | Amarillas et al. |
| 2003/0178892 | A1 | 9/2003 | Black et al. |
| 2007/0110192 | A1 | 5/2007 | Steiner |
| 2010/0194304 | A1 | 8/2010 | Mosebrook et al. |
| 2010/0283391 | A1 | 11/2010 | Braunshtein |
| 2012/0074792 | A1 | 3/2012 | Hodges et al. |
| 2012/0229170 | A1 | 9/2012 | Scholder |
| 2013/0162168 | A1 | 6/2013 | Ostrovsky et al. |
| 2013/0181630 | A1 | 7/2013 | Taipale et al. |
| 2013/0293137 | A1 | 11/2013 | Jennings et al. |
| 2014/0081474 | A1 | 3/2014 | Blakeley |
| 2014/0327372 | A1 | 11/2014 | Zhang et al. |
| 2016/0278176 | A1 | 9/2016 | Chen |
| 2017/0150566 | A1 | 5/2017 | Vanderzon |
| 2017/0171950 | A1 | 6/2017 | Barna et al. |
| 2017/0223808 | A1 | 8/2017 | Barna et al. |
| 2018/0115161 | A1 | 4/2018 | Marsh-Croft |
| 2018/0160494 | A1 | 6/2018 | Vanderzon |
| 2019/0191518 | A1 | 6/2019 | Guan et al. |
| 2020/0084852 | A1 | 3/2020 | DeJonge et al. |
| 2021/0289596 | A1 | 9/2021 | Vanderzon et al. |
| 2021/0321502 | A1 | 10/2021 | Ostrovsky et al. |
| 2021/0368598 | A1 | 11/2021 | Sanghvi et al. |

OTHER PUBLICATIONS

International Search Report and Written Opinion for PCT/US2018/053260 completed Nov. 15, 2018, 9 pgs.
International Search Report and Written Opinion for PCT/US2020/060328 completed Mar. 30, 2021, 22 pgs.
Non Final Office Action issued in U.S. Appl. No. 17/267,520 dated Dec. 8, 2021, 6 pgs.
Non Final Office Action issued in U.S. Appl. No. 17/267,520 dated Aug. 10, 2021, 15 pgs.
Notice of Allowance issued in U.S. Appl. No. 17/267,520 dated Jun. 2, 2022, 8 pgs.
Office Action in U.S. Appl. No. 17/325,164 dated Apr. 25, 2022, 39 pgs.
Notice of Allowance issued in U.S. Appl. No. 17/325,164 dated Jul. 28, 2022, 14 pgs.
Office Action issued in U.S. Appl. No. 17/804,005 dated Mar. 1, 2023, 17 pgs.

* cited by examiner

SWITCHING CONTROL IN ELECTRICAL LOAD CONTROLLERS

BACKGROUND

Typical electrical load controllers, such as lighting control dimmers for controlling brightness of a lighting load, vary the supply of power to the electrical load by varying the points during the alternating current (AC) waveform of a supply of AC power at which the power is switched on and off to the attached electrical load. Precise control of these switching points can be important. In the case of a lighting load, proper control of the switching points can minimize perceived variation in the brightness of the light and minimize flickering of the light.

Microprocessor-based electrical load controllers detect the zero-crossings of the AC waveform and switch the power to the load on/off at fixed times relative to the zero-crossings in order to achieve the desired supply of AC power to the load (e.g. proper lighting level of a lighting load). Different nominal AC power line frequencies, such as 50 Hz or 60 Hz, typically require the use of dimmers specific to that frequency or the ability to switch a given dimmer between specifically supported frequencies.

SUMMARY

Shortcomings of the prior art are overcome and additional advantages are provided through a method of operating an electrical load controller. The method includes detecting zero-crossings of an alternating current (AC) waveform of a supply of AC power, the AC waveform oscillating though full cycles, each full cycle comprising a positive half cycle and a negative half cycle of the AC waveform; determining, using the detected zero-crossings, a plurality of periods, each period corresponding to a full cycle of the AC waveform, and the determined periods being a fixed number of periods of a plurality of most recent full cycles of the AC waveform; determining a frequency of the AC waveform based on the determined plurality of periods of the full cycles of the AC waveform; and controlling a supply of AC power to a load based on the determined frequency of the AC waveform, wherein the controlling uses the determined frequency to fire a switching circuit of the electrical load controller in a plurality of half cycles of the AC waveform to selectively control the switching circuit to conduct the AC power to the load.

In another embodiment, a method of operating an electrical load controller is provided that includes detecting, by receiving an input by a microprocessor of the electrical load controller, zero-crossings of an alternating current (AC) waveform of a supply of AC power, the AC waveform oscillating though full cycles, each full cycle comprising a positive half cycle and a negative half cycle of the AC waveform, where the detected zero-crossings of the AC waveform all occur at either negative-going transitions or positive-going transitions of the AC waveform, and where the microprocessor is configured to detect the zero-crossings (i) at the negative-going transitions and ignore the positive-going transitions of the AC waveform, or (ii) at the positive-going transitions and ignore the negative-going transitions of the AC waveform; determining, using the detected zero-crossings, a plurality of periods, each period corresponding to a full cycle of the AC waveform; determining a frequency of the AC waveform based on the determined plurality of periods of the full cycles of the AC waveform; and controlling a supply of AC power to a load based on the determined frequency of the AC waveform, wherein the controlling uses the determined frequency to fire a switching circuit of the electrical load controller in a plurality of half cycles of the AC waveform to selectively control the switching circuit to conduct the AC power to the load.

Electrical load controllers configured to perform method(s) described herein and computer program products having a computer readable storage medium readable by a processing circuit and storing instructions for execution by the processing circuit to perform the method(s) described herein are also provided.

Additional features and advantages are realized through the concepts described herein.

BRIEF DESCRIPTION OF THE DRAWINGS

Aspects described herein are particularly pointed out and distinctly claimed as examples in the claims at the conclusion of the specification. The foregoing and other objects, features, and advantages of the disclosure are apparent from the following detailed description taken in conjunction with the accompanying drawings in which:

DETAILED DESCRIPTION

Described herein are approaches for controlling the supply of power to an electrical load. Examples presented herein refer to a lighting load as an example electrical load and a dimmer as an example electrical load controller. However, aspects described herein are applicable to any of various other types of electrical load controllers that control supply of power to any of various other types of electrical loads. For instance, an electrical load controller could be a fan speed controller to control a supply of power to a fan or blower, as an example. Many other examples exist.

Both temporary variations in the nominal AC power line frequency, for instance 50 Hz or 60 Hz, and incorrectly detecting actual zero-crossing points of the AC waveform can result in flickering and/or perceptible changes in the brightness of the light. Electrical noise that occurs near the zero-crossing can present false-positives leading to an inaccurate determination of the true zero-crossing. Similarly, a difference in the point that the zero-crossing is detected between positive-going and negative-going half cycles of the AC waveform can also result in perceptible flickering of the light. Typically there is an electronic circuit (a "zero-cross" or "zero-crossing" detection circuit) that measures the zero-crossings of the AC waveform by comparing voltage and switching a zero-crossing (ZC) signal between states, e.g. HI and LOW, at different times depending upon whether the AC waveform is passing through zero volts from positive to negative (a negative-going ZC) or negative to positive (a positive-going ZC). Challenges exist in switching between these two states symmetrically for positive-going and negative-going zero-crossings.

Figure 1:
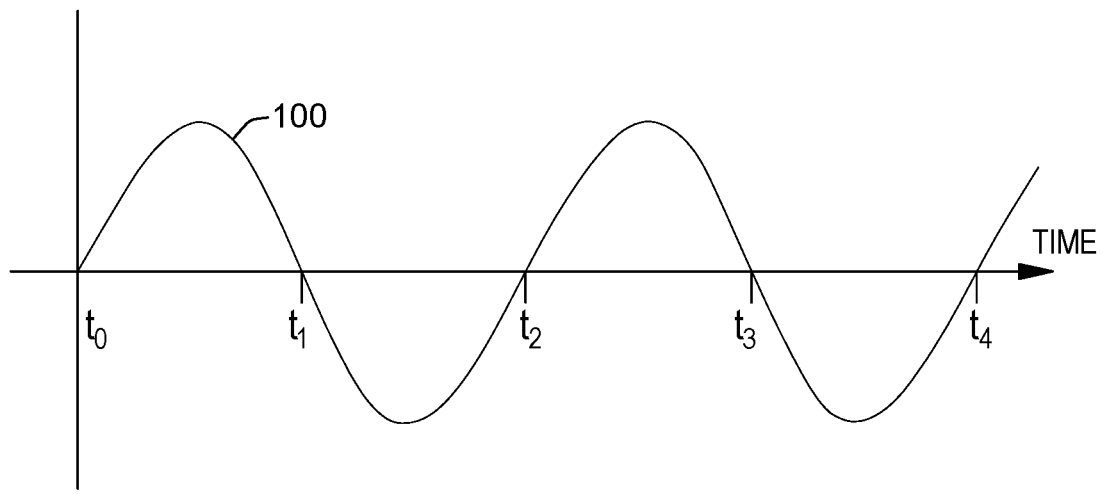
FIG. 1 depicts an example AC waveform having a consistent frequency.

FIG. 1 depicts an example AC waveform having a consistent frequency. The AC waveform oscillates through full cycles, each including a positive half cycle and a negative half cycle of the AC waveform. The AC waveform has a nominal frequency, for example 60 Hz, in which each full cycle theoretically completes in $\frac{1}{60}^{th}$ of a second. Frequency of the waveform 100 in a first cycle extending from time t0 through time t1 to time t2, for example 60 Hz, would match the frequency of the waveform 100 in a next cycle extending from time t2 through time 3 to time t4. In other words, the duration of each full cycle would be the same if frequency does not vary.

Figure 2:
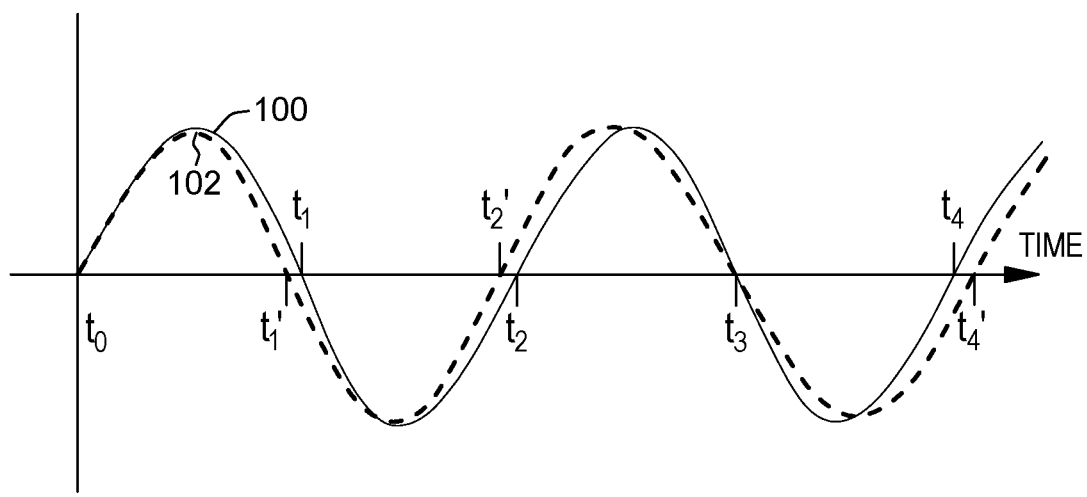
FIG. 2 depicts the example AC waveform of FIG. 1 and an AC waveform having a varying frequency.

FIG. 2 depicts the example AC waveform of FIG. 1 and an AC waveform having a varying frequency. AC waveform 100 is again depicted in FIG. 2 extending from time t0 to time t4. The dotted AC waveform 102 depicts an example waveform with a varying frequency (exaggerated for illustration as compared to a typical practical example). The waveform 102 may have a nominal frequency of 60 Hz but in practice the cycle-to-cycle frequency can vary. Here, the first full cycle of waveform 102 extends from time t0 through its first zero-crossing at time t1', which is earlier than the expected time t1, to time t2', which is earlier than the expected time t2. The first full cycle of waveform 102 therefore completes in a shorter duration of time than the first full cycle of waveform 100 having a frequency of 60 Hz. The frequency of the waveform 102 as reflected by its first full cycle is therefore greater than 60 Hz, for example 60.2 Hz.

The second full cycle of waveform 102 is considerably longer in duration than is the first full cycle of waveform 102, as it extends from time t2' through time t3 to time t4'. The duration of time from t2' to t4' is longer than the duration of time from t2 to t4, which corresponds to a frequency of 60 Hz. The frequency of the waveform 102 as reflected by its second full cycle is therefore less than 60 Hz, for example 59.9 Hz.

In real-world applications, the frequency of an AC waveform can vary around some average that corresponds more or less to the nominal frequency of the AC waveform.

With varying cycle-to-cycle frequencies comes half cycle durations that are not consistent in duration, as is illustrated in FIG. 2. The half cycle frequency may be slightly different on each half cycle; a positive half cycle might correspond to a 60.1 Hz frequency and the negative half cycle might correspond to a 59.9 Hz frequency. This can matter when switching a dimmer on both half cycles of the AC waveform. Potentially 120 times a second (for a 60 Hz frequency waveform) the switching circuit may be turning on/firing at slightly different times relative to the preceding zero-crossing. This can sometimes result in perceptible flicker, i.e. 'vibrating', and is inconsistent with a general desire for symmetrical switching.

Aspects described herein seek to improve upon current approaches by more accurately determining the true zero-crossing points of the AC waveform, eliminating flickering or other adverse effects caused by differences in the zero-crossing detection between positive-going and negative-going half cycles of the AC waveform, using the zero-crossing points of the AC waveform to determine the present AC waveform frequency, based on this frequency, precisely calculating the times relative to the zero-crossings of the AC waveform that the load should be switched on and off to achieve the desired output, and allowing a device to precisely control the power delivered to a load regardless of the AC power line frequency.

Aspects described herein may be useful in applications where precise timing of output load switching is used to control the power delivered to a load. Typical applications including lighting controls utilizing semiconductor switching elements, such as triode for alternating current (TRIAC)-based or metal-oxide semiconductor field-effect transistor (MOSFET)-based dimmers.

By way of background, many countries have an electric grid infrastructure that uses alternating current as a power source (referred to herein as an "AC source"). These systems can be either balanced or unbalanced and may include a phase line ("phase conductive path") and a return path (usually referred to as a "neutral" line or "neutral conductive path"). The "neutral" conductive path can be used as a return path for the AC source supplied by a phase conductive path. A conductive path can also be referred to as a "wire". The terms "conductive path", "conductor", and "wire" are considered herein to be synonymous. For safety reasons, the neutral wire is typically grounded at some juncture, for instance the main electrical panel. Although a ground wire is typically present at all electrical boxes, a neutral wire may not be present in some electrical boxes, such as switch boxes used to control a lighting load. In such instances, the electrical box typically contains a phase wire, a load wire, and a ground wire (or ground connection via a metal sheath of the electrical cable). As such, the lighting load is to be controlled by a device referred to as a "two-wire device" (examples of which are a switch or a dimmer), where the phrase "two-wire" refers to the phase wire and the load wire (e.g. the absence of a neutral wire). As such, a two-wire device does not exclude the possibility of the device being connected to a third, ground wire.

Many dwellings and office buildings use either a single or multi-phase AC source and/or some combination thereof. The AC source may be accessed by standardized connections (referred to as "plugs") that prevent a user from improperly connecting to an AC source, e.g., a three-phase AC plug cannot connect to a two-phase AC outlet. Additionally, many AC sources may selectively apply electricity to a load based upon whether a switch is turned on or off, e.g., a light switch.

In some approaches, zero-crossings of an input line voltage (AC waveform) are detected by detecting a change in the polarity of the voltage across (i) an input line voltage terminal and an output load terminal or lead, in the case of two-wire devices without a neutral connection, or (ii) the input line voltage terminal and return neutral or ground wire terminal, as in three wire devices with a neutral connection or two-wire devices using a ground leakage path. "Terminal" can be any type of terminal, lead or other termination, and includes, but is not limited to, a screw terminal, which is just one example of a terminal of a dimmer circuit. In some embodiments, a direct connection by a dimmer circuit to a neutral side N of the AC power source can be available, enabling the dimmer circuit to be configured as a three-wire dimmer circuit.

Figure 3:
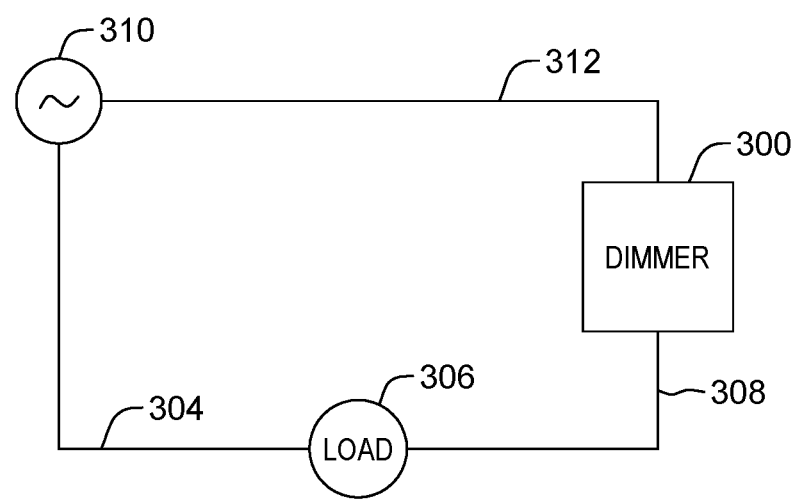
FIG. 3 depicts an example of a dimming system including a two-wire dimmer.
Figure 4:
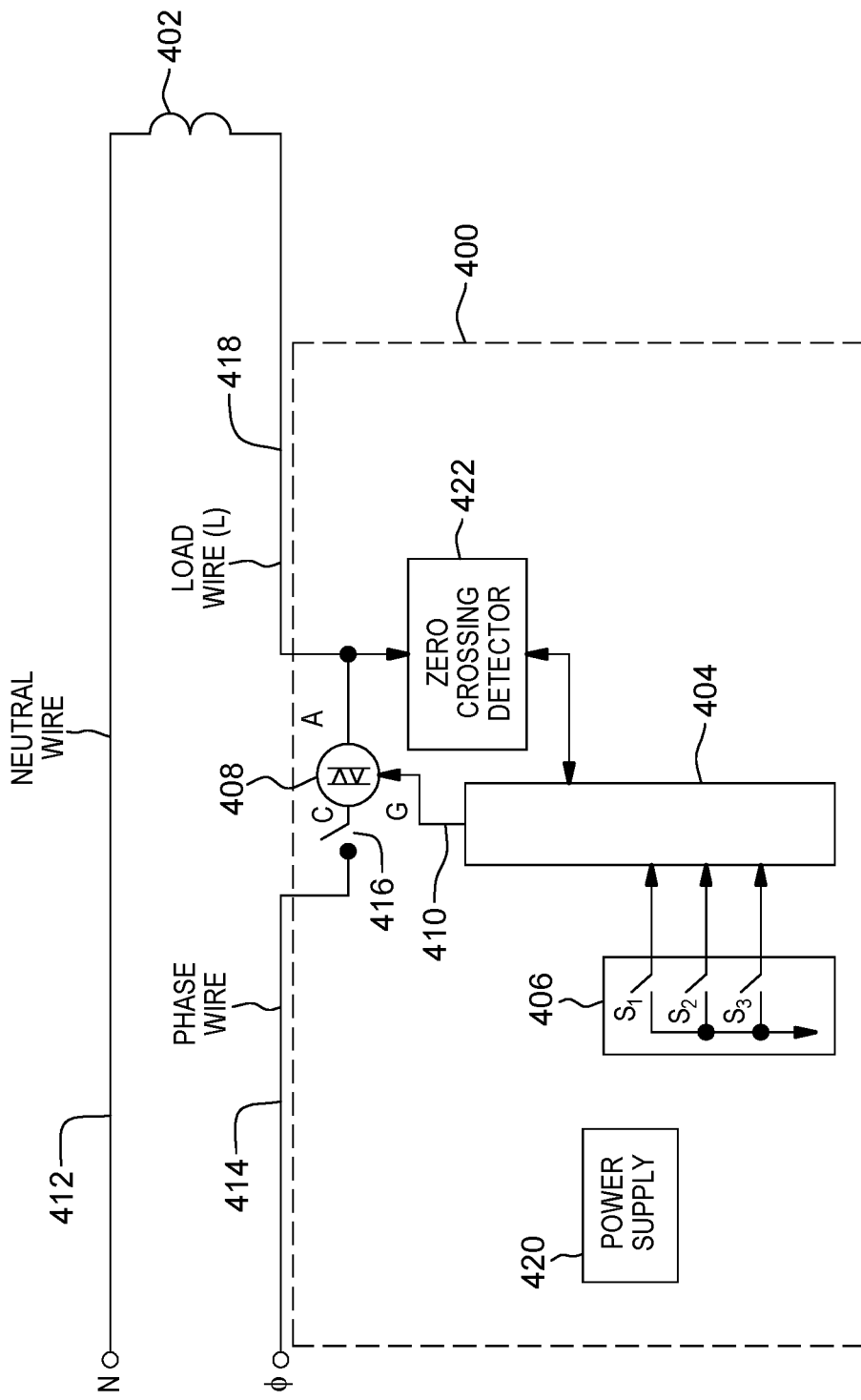
FIG. 4 depicts further details of an example two-wire dimmer.

FIGS. 3 and 4 depict example dimming systems that including a two-wire dimmer. While two-wire dimmers are discussed, it is noted that aspects described herein apply as well to three-wire dimmers.

In particular, FIG. 3 depicts an example of a dimming system including a two-wire dimmer. Two-wire dimmer 300 is shown, whereby current travels from AC source 310 via phase conductive path 312 through dimmer 300 and through load 306 via load wire or conductive path 308 to AC source 310 via neutral wire or conductive path 304. The dimmer 300 includes a circuit to control the power delivered to the load 306 by "chopping" the current coming from AC source 310. A controller/microcontroller may operate a power switch to regulate the power delivered to the load using a phase control technique. The AC source has a sinusoidal waveform that oscillates through cycles. More specifically, each sinusoidal cycle is referred to as a full cycle. Each full cycle includes a positive half cycle and a negative half cycle that complete a single full cycle of the AC power. The positive half cycle begins at a first zero-crossing of the full cycle and ends at a midpoint zero-crossing at the midpoint of the full cycle. The negative half cycle begins at the midpoint zero-crossing of the full cycle and ends at another zero-crossing at the end of the full cycle. For typical 60 Hz power, an entire AC cycle occurs in 1/60th of a second.

When employing "forward phase" dimming with a latching power switch or "switching circuit" (e.g., a TRIAC), the power switch remains off at the beginning of an AC half-cycle during a delay period until the desired firing angle is reached. The TRIAC is turned on at a firing angle by applying one or more pulses via a control signal to the gate of the TRIAC to connect the AC source to the load. Alternately, a constant/long duration pulse (as opposed to discrete pulses) can be supplied to the gate of the TRIAC to hold the TRIAC in a conducting state for the remainder of the half-cycle regardless of the level of current being conducted through the load. The portion of the AC voltage waveform actually applied to the load is that portion extending from the firing time to the end of, or near the end of, the half cycle. The portion of the AC voltage waveform applied during that portion of the AC cycle is referred to as the conduction period of the positive half cycle. The TRIAC continues conducting power to the load during this time until it switches off at (or near) the midpoint zero-crossing. In this regard, TRIACs are self-commutating devices, meaning that they would typically turn themselves off when the current through the device falls below a holding level after the control signal has been removed. The same process can be repeated for the negative half cycle, in which the TRIAC turns on after a delay period and turns off at (or near) the next zero-crossing, if the switching schedule is to fire in both half cycles of each full cycle. In this regard, it is noted that switching may occur in only the positive, only the negative, or in both positive and negative half cycles of the AC waveform, if desired. Generally, if the load is purely resistive, the current flowing through the load is essentially synchronized with the AC voltage applied to the load, with no phase shift between the current and the voltage. Additionally, the firing delay periods for the two half cycles of a full cycle are generally equal in duration, though they could be different.

Varying the conduction period varies the percentage of available power delivered to the load, thereby regulating the total amount of power delivered to the load. If the load is a lighting load, regulating the amount of power controls the brightness of the load.

It is understood that while other types of power switches, like metal-oxide semiconductor field-effect transistor (MOSFETs) and insulated-gate bipolar transistors (IGBTs), are similarly used to control conduction and firing angles, the controlling of these switches may be different from the manner described above, which is provided by way of example only.

Some power switches, such as transistors and relays, receive a constant gate signal during the entire conduction period. Other power switches, such as TRIACs and silicon-controlled rectifiers (SCRs), have regenerative switching properties that cause them to latch in the conductive state in response to short gate pulse(s) if the load current exceeds a latching level. Once in the conductive state, the power switch remains conductive—even if the control signal is removed—until the current through the switch drops below a holding level. At that point, the power switch automatically switches off. This typically occurs when the load current drops below the holding level at or near a zero-crossing.

By way of specific example, a gate pulse may be used for a transistor or other power switch requiring a continuous gate pulse during the entire conduction period. This may also be referred to as a continuous signal or a 'constant gate control signal'. Thus, the gating operation consumes power during the entire conduction period. This technique can be, and in some instances is, used to maintain a latching power switch such as a TRIAC or SCR in a conducting state when there may otherwise not be enough current to do so.

In examples where only a short gate pulse is used to trigger a TRIAC or SCR and latch for substantially the remainder of the half cycle, the gating operation consumes power only during a small fraction (duration of the short gate pulse) of the conduction period, thereby reducing the overall power consumption.

A short gate pulse gating technique may work adequately with a purely resistive load, however a different set of challenges is presented when used with loads having an inductive or nonlinear characteristic. Noise can appear on the current through the load leading to a misfiring. For example, the current drawn by a magnetic low-voltage (MLV) load typically does not follow the waveform of the AC source (e.g. input voltage) to the dimmer. Instead, since the current is delayed (e.g. lagging) with respect to the AC voltage, a misfiring event could lead to an asymmetry in the current waveform, which causes saturation of the transformer of the MLV load and results in a large inrush of current. This is in contrast to a resistive load in which the current corresponds directly with the voltage waveform without a phase shift. If a short gate pulse is applied to the TRIAC during the time period between the start of the cycle and the time at which current draw begins, the MLV load may fail to turn on and/or remain on. That is, since the gate pulse is applied at a time when the MLV load draws no current, the switching device, e.g., the TRIAC, may not turn on at all, and the entire half cycle of conduction may be missed. Alternatively, if the gate pulse is applied at a time when the load may draw some current, but not enough to latch the TRIAC in the conductive state, the load may receive power only during the duration of the gate pulse, and the result may be a short flash of light from the load, i.e., flicker. Thus, the firing angle corresponding to the time at which current draw begins could represent the limit for maximum brightness, i.e., the maximum possible conduction time.

Likewise, there is typically a firing angle corresponding to a minimum brightness close to the end of the half cycle. If the TRIAC is gated too late, it may fail to conduct any power to the MLV load or it may only conduct during the gate pulse period if the MLV load does not draw enough current to latch the TRIAC or hold the TRIAC in the conductive state for the appropriate length of time. The result may be a flicker of light, or the lamp may turn off abruptly rather than dimming smoothly as the lower end to the dimming range is approached. Problems at the lower end of the range may be compounded by the decreasing line voltage that is available, as well as the short duration of the conduction period through the TRIAC. The above problems may also be seen with other types of loads, other than MLV.

The firing angles for minimum and maximum brightness for any given load, however, may not be known in advance. Moreover, the firing angle limits may change due to variations in operating conditions such as lamp wattage, number of lamps on the circuit, line voltage, temperature, etc., as well as variations between lamps from different manufacturers, manufacturing tolerances, lamp age, etc.

One way to assure that the TRIAC will be triggered when operating near the point of maximum brightness is to continue gating the TRIAC during the entire conduction period. Then, even if the gate pulse begins before the time at which current draw begins, the continuous gating assures that the TRIAC will eventually begin conducting to the MLV when the MLV load begins drawing current. This may, however, consume more power than the power supply can provide.

Another technique for overcoming uncertainty in the precise timing to trigger switch firing near the points of minimum and maximum brightness involves the use of multiple gate pulses. Using enough pulses over an appropriate length of time can assure that at least one of the pulses will trigger the TRIAC at a time when the load will draw enough current to latch. Because two-wire dimmers are limited in the amount of power they can draw through the load, use of latching power switches that can be triggered by short pulses may be adopted because it reduces the amount of power required by a controller.

The above example situations highlight just some considerations that may be appropriate to consider when determining desired parameters for proper dimmer operation.

FIG. 4 depicts further details of an example two-wire dimmer and operation thereof. In FIG. 4, dimmer 400 receives power from the AC source via phase wire 414 and delivers power to load 402 via load wire 418.

The dimmer includes digital control electronics and code for execution to perform various aspects, including aspects described herein. The digital control electronics and/or code can be implemented via processor(s), microprocessor(s), controller(s), microcontroller(s) (sometimes referred to collectively as "controller", "processor", "computer processor", or "processing circuit"), and the like. In the embodiment of FIG. 4, controller 404 is coupled to one or more user-accessible actuators 406. A user of dimmer 400 is able to engage or otherwise interface with actuator(s) 406 and the controller 404 may receive the command information and interpret this as a command or a set of commands to perform one or more actions for or relating to controlling operation of the dimmer and therefore control the delivery of power to the load 402.

Dimmer 400 can control, for example, the amount of current flowing through load 402 by tailoring the parameters activating TRIAC 408, as described above. TRIAC 408 is a bidirectional three terminal semiconductor device that allows bidirectional current flow when an electrical "control" signal of proper amplitude is applied to its "G" (or gate) terminal via control conductive path 410. TRIAC 408 also has a "C" (or cathode terminal) and an "A" or anode terminal. When an electrical signal is applied to the gate G, TRIAC 408 is said to be gated. When properly gated, current (or another electrical signal) can flow from the "C" terminal to the "A" terminal or from the "A" terminal to the "C" terminal. When TRIAC is not gated or is not properly gated, relatively very little or substantially no current (or no signal) can flow between the "A" and "C" terminals. TRIAC 408 thus acts as an electrically controlled power switch that can allow some or no current flow based on the amplitude of the electrical signal applied to its "G" terminal. Alternatively, the switching component of FIG. 4 (TRIAC 408) could in some examples be implemented as two TRIACs TR1 and TR2, where TRIAC TR1 is controlled by controller 404, which applies a fire signal onto control conductive path 410 to turn on TRIAC TR2, which in turn gates TRIAC TR1 allowing an AC signal to pass through load 402 and back to the AC source via neutral wire 412.

Connected in series to TRIAC 408 is mechanical switch 416. Mechanical switch 416 can be an "air gap switch" that can be activated to stop current flow through the dimmer 400, thus stopping current flow through the load wire 418, load 402 and neutral wire 412. Mechanical switch 416 disconnects power to the dimmer 400 and load 402 to permit servicing and/or replacement of a light bulb, etc. TRIAC 408 can be gated to provide current amounts (e.g. via waveform chopping) related to intensities of load 402 (for example intensity of the light if load 402 includes a lighting element, fan speed if light 402 includes a fan, etc.) or can be gated to provide substantially no current, thus essentially switching off load 402.

Power supply 420 is provided to power operation of component(s) of dimmer 400. Power supply may receive power from the phase conductive path 414, in one example. The power supply 420 may power, for instance, operation of controller 404. The controller 404 can be coupled to and communicate with a zero-crossing detector circuit 422. The zero-crossing detector circuit 422 outputs a zero-crossing signal. The controller 404 can use the zero-crossing signal for various timing functions, such as the proper timing of pulses/signals that the controller 404 generates to control TRIAC 408.

Aspects presented herein utilize a ZC detection circuit to detect the zero-crossings of an incoming AC waveform of a supply of AC power. Typically, though not always, the ZC detection circuit includes a comparator that provides a positive output (HI signal) when the voltage exceeds some threshold voltage (e.g. 1 V), and a zero or "non-assertive" voltage (LOW signal) when the voltage is at or below the threshold. In this manner, the ZC signal presented from the ZC detection circuit can present as a square wave that transitions between HI (e.g. "1") and LOW (e.g. "0") states. In some examples, the transition from LOW to HI represents a positive-going zero-crossing and the transition from HI to LOW represents a negative-going zero-crossing. Based on detecting zero-crossings, these can be timed to determine a frequency of the incoming waveform and, based on this determined frequency and a desired load level (power output) setting, a process can determine the times relative to the zero-crossings of the AC waveform that the load should be switched on and off in order to achieve the desired output. The switching is accomplished by selectively controlling a control signal to the switching circuit between an ON state, to fire the switching circuit, and an OFF state.

Given a detected frequency, configuring the dimmer's controller to dim properly (to the proper level) can be accomplished. In forward phase dimming, this means delaying firing of the switching circuit for a set amount of time after the zero-crossings. In reverse phase dimming, this means firing the switching circuit at or near the zero-crossing to begin a half cycle and unlatching the switching circuit at a set time prior to the end of the half cycle. Maintaining the same firing delay time in forward phase dimming, or set time prior to the end of the half cycle for reverse phase dimming, despite the frequency varying across phases, can result in differential levels of light output. Consequently, adjusting these times responsive to frequency changes can be advantageous.

Figure 5:
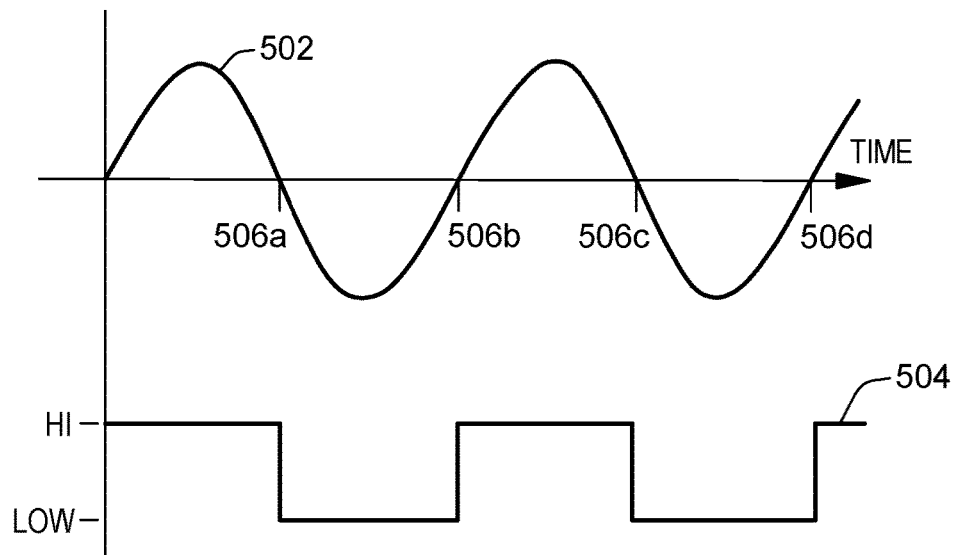
FIG. 5 depicts an example AC waveform and corresponding zero-crossing signal.

In ZC detection circuits having a comparator used to determine whether the voltage of the waveform exceeds a specified threshold, the resulting output (ZC signal) of such a comparator would approximate a square wave, where the output is in one state during the positive half cycle of the waveform and in the opposite state during the negative half cycle of the waveform. FIG. 5 depicts an example AC waveform 502 and corresponding theoretical square wave zero-crossing signal 504. It is seen that at zero-crossings 506a, 506b, 506c, 506d of the AC waveform are corresponding transitions of the ZC signal from HI to LOW or vice-versa.

Practical approaches can suffer from an asymmetry in the output of the ZC detection circuit caused by a small, but non-zero, switching threshold (such as +1 V for instance). If the ZC circuit is configured to transition the ZC signal at +1 V, that corresponds to a different point on the positive-going waveform transitions than on the negative-going waveform transitions. When relying on positive-going and negative-going zero-crossings, this can result in a bias on the switching based on the difference in timing between the two half cycles. If switching longer on the positive side than on the negative side, this produces something akin to a direct current (DC) to the load, and examining the waveform output of the load control will present a DC offset. In this regard, and speaking ideally/theoretically, the AC waveform is a periodic sinusoidal waveform where each full waveform cycle has two symmetrical (equal duration, amplitude, etc.) half-cycles, i.e. one of positive voltage polarity, and one of negative voltage polarity. Because of this symmetry, the average DC voltage of each of the two half-cycles is equal in magnitude but opposite in polarity. Therefore, over a full cycle (or multiple full cycles) of the AC waveform, the average DC voltage is zero since the positive and negative values 'cancel'. If, due to asymmetry in the zero-crossing detection circuit, one of the AC waveform half-cycles is switched onto the load for a longer time than the adjacent half-cycle, the average DC voltage of the two switched half-cycles are no longer equal in magnitude and, therefore, do not completely 'cancel'. Hence, the average DC voltage applied to the load is non-zero. This can be detrimental in certain devices from a reliability standpoint and lead to improper operation. Hence, there is a desire to switch the power supply to the load symmetrically, rather than asymmetrically, on the positive side as compared to the negative side.

Figure 6:
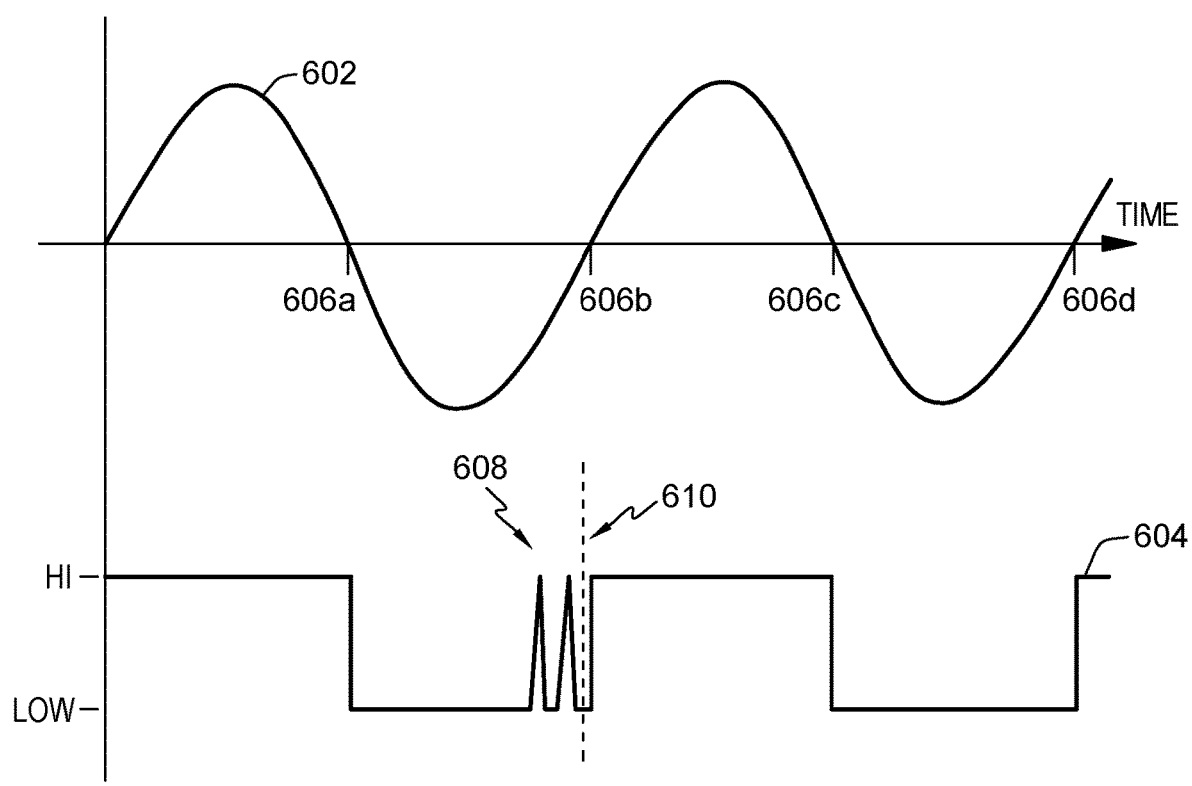
FIG. 6 depicts an example AC waveform and corresponding zero-crossing signal with multiple transitions in output level.

In addition, electrical noise around the switching threshold can result in multiple transitions in the output level near the switching threshold unless enough hysteresis is introduced into the circuit. This too can add to the asymmetry of the output waveform. FIG. 6 depicts an example AC waveform and corresponding zero-crossing signal with multiple transitions in output level. 602 is the AC waveform and 604 is the corresponding ZC signal in a practical application. It is seen that there are transitions of the ZC signal 604 at zero-crossings 606a, 606b, 606c, 606d of the AC waveform. However, there are multiple transitions (see 608) in the ZC signal just before the true zero-crossing at 606b and during the half cycle extending from 606a to 606b. Taking either of the two false-positives as the true zero-crossing indication can be problematic.

To eliminate the effects of asymmetry, aspects described herein can make use of either the positive-going (LOW to HI) or negative-going (HI to LOW) edge of the output waveform (ZC signal) as a zero-crossing reference, rather than utilizing both the positive-going and negative-going edges. This can ensure that a common point in the AC waveform is being used to determine the frequency of the waveform and that the output switching of the load is done at the same relative points on both the positive and negative half cycles (if switching during both half cycles) of the AC waveform. Under this approach, extraneous ZC indications (either positive-going or negative-going edges) can be disregarded by a microprocessor/controller of the dimmer. In this regard, a timer subsystem of the microprocessor might typically record the times of transitions of the ZC signal from LOW to HI and vice versa, and 'filter'-out the extraneous times/edges not of interest.

In some embodiments, an 'input capture' feature of a microprocessor's timer subsystem is used to capture the time of the zero-crossing references. An 'output compare' feature enables setting a timer reference in the timer subsystem to cause something to happen when the timer reaches a given value, for instance to switch an output in a certain way. In accordance with aspects described herein, the input capture can be configured to capture the ZC indications (via the ZC signal) of interest. Some examples presented herein focus on the positive-going zero-crossings, but it could alternatively use the negative-going zero-crossings.

The time of the zero-crossing references/indications of interest is saved and updated on each of various cycles of the AC waveform, for instance each of several sequential full cycles. The time difference between two sequential zero-crossing reference points of interest (e.g. negative-going or positive-going, which corresponds to every other zero-crossing, i.e. full cycles) is then used to determine the period of each such cycle of the AC waveform.

Improvements upon the accuracy of the zero-crossing reference detection and waveform frequency determination are hereby provided. In one aspect, the calculated waveform frequency can be "smoothed" by averaging detected frequencies or other methods.

Accordingly, and by way of specific example, a process performed by an electrical load controller can detect zero-crossings of an AC waveform of a supply of AC power that oscillates though full cycles, with each full cycle including a positive half cycle and a negative half cycle of the AC waveform. The detected zero-crossings can include just positive-going transitions, just negative-going transitions, or both. Thus, the detected zero-crossings could be for (i) consecutive positive-going or negative-going transitions to correspond to consecutive cycles of the AC waveform, (ii) non-consecutive positive-going or negative-going transitions to correspond to non-consecutive cycles of the AC waveform, or a combination of consecutive and non-consecutive transitions. The detected zero-crossings of the AC waveform could be detected from either (i) falling edges (transitions from a HI state to a LOW state) of a zero-crossing signal, where rising edges (transitions from the LOW state to the HI state) of the zero-crossing signal are ignored or discarded, (ii) rising edges (transitions from the LOW state to the HI state) of a zero-crossing signal, where falling edges (transitions from a HI state to a LOW state) of the zero-crossing signal are ignored or discarded, as examples, or (iii) both. The detection of the zero-crossings may be by receiving an input by a microprocessor of the electrical load controller, where the microprocessor may be configured to detect zero-crossing only at the negative-going transitions (ignoring the positive-going transitions) of the AC waveform or the positive-going transitions (ignoring the negative-going transitions) of the AC waveform.

The process can also determine, using the detected zero-crossings, a plurality of periods, each period of the plurality of periods corresponding to a respective full cycle of a plurality of full cycles of the AC waveform. The full cycles could be consecutive full cycles of the AC waveform, though they could instead be non-consecutive, for instance every other full cycle as one example. In a particular example, the determined periods can be periods of a fixed number of most recent full cycles of the AC waveform, for instance the most recently completed 10 full cycles.

The process can then determine a frequency of the AC waveform based on the determined plurality of periods of the full cycles of the AC waveform. The determination of the frequency of the AC waveform can use any desired approach. In some examples, it is determined as the median value of the determined periods. In other examples, the determined frequency of the AC waveform is determined as an average of the determined periods.

Thus, in some embodiments, the respective periods of each of several cycles of the AC waveform are determined and a fixed number of the most recently determined periods is saved. The median value of these is then selected and used as the waveform's period, and the waveform frequency can be determined therefrom. In some examples, a median value is used instead of an average value of the most recently determined periods to minimize an impact of outlier values (due to noise, for example).

Based on the determined frequency, the process controls the supply of AC power to the load. This controlling can use the determined frequency to fire a switching circuit of the electrical load controller. For instance, the frequency can inform the firing time/angle with respect to zero-crossing during (each of) a plurality of half cycles of the AC waveform to selectively control the switching circuit to conduct the AC power to the load. The plurality of half cycles during which the firing is based on the determined frequency could include at least the next positive and (optionally the) negative half cycle following determination of the frequency. The process could repeat for the next full cycle, or repeat some number of cycles later. It is noted that in some embodiments switching occurs in only positive or only negative half cycles of the AC waveform, in which case the determined frequency may be used to fire the switching circuit in the appropriate positive or negative half cycles as the case may be.

This controlling uses the determined frequency in determining the specific turn on and turn off times for the switching circuit. As the frequency varies and the process is repeated, so too can these times be changed based on the determined changing frequencies so that the on/off phase angles are constant with changes in line frequency. Specifically as part of this controlling, it can use the determined frequency to determine a half cycle time of the AC waveform (i.e. half of the determined period), and determine from the half cycle time points of the AC waveform when the AC power to the load is to be switched on or off.

The above can be repeated across a duration of time during which the electrical load controller is turned on to selectively control the switching circuit to conduct the AC power to the load. That is, detecting zero-crossings, determining a plurality of periods of full cycles, determining the frequency of the AC waveform, and controlling power to the load based on the determining frequency can be iterated repeatedly in order to continually update the turn on and turn off times of the switching circuit corresponding, and responsive, to the variations in frequency of the AC waveform.

As discussed above, electrical noise near a zero-crossing of the AC waveform can result in multiple transitions in the output signal of the zero-crossing circuit. Using only one edge of this ZC output signal to determine the zero-crossing reference could result in the zero-crossing reference being off by one-half cycle. To prevent this, and in accordance with additional aspects described herein, the determined waveform period can be used to ignore false transitions. If the input capture is triggered (indicating a zero-crossing) significantly before the next zero-crossing is expected based on the most recent determined frequency, the indication can be ignored. The time of a next expected zero-crossing indication can be determined by adding a determined AC waveform period (e.g. the latest-determined period) to the time of the previous actual zero-crossing reference. Any input capture event indicating a zero-crossing occurring a predetermined fraction of the determined AC waveform period before the time of the next expected zero-crossing reference can be ignored.

Referring back to FIG. 6, assume that a current time is between the time of zero-crossing 606a and zero-crossing 606b. Based on a determined frequency of the waveform 602, a window of time when to expect zero-crossing 606b to occur is set. The window can open up some defined amount of time prior to the expected time as calculated from the determined frequency/period. Dotted line 610 corresponds to an example time at which that window opens. The premature zero-crossing indications in the form of the two peaks referenced as 608 may be ignored on the basis that the window has not opened. After the window is opened at the time corresponding to the dotted line, then the next transition from LOW to HI is not ignored but is instead taken as the true zero-crossing indication, and ZC 606b is accurately indicated by the ZC signal.

In accordance with these aspects, a process can determine an expected time of an upcoming (i.e. future-occurring) zero-crossing of the AC waveform that transitions from a first full cycle to a second full cycle. Determining this expected time can include adding a calculated period of the determined frequency to a time of a prior-detected zero-crossing. The prior-detected zero-crossing could be the most-recently detected zero-crossing if the detected zero-crossings are just those zero-crossings between full cycles. Otherwise, if zero-crossings are being detected at each half cycle transition, the expected time could be determined by adding half the determined period to the time of the last-encountered zero-crossing, i.e. just prior to the upcoming/next zero-crossing. Based on the expected time of the upcoming zero-crossing, the process can set a window of time during which a zero-crossing indication of the zero-crossing signal of the electrical load controller is taken as being valid, where zero-crossing indication(s), of the zero-crossing signal, occurring prior to the window of time are ignored. Specifically, those that are ignored could be those that occur during the current half cycle prior to the beginning of the window of time. The window can extend from a defined amount of time before the expected time of the zero-crossing to a defined amount of time after the expected time of the zero-crossing, as an example. One particular approach when triggering based on full cycle zero-crossings (e.g. only positive-going or only negative-going zero-crossings) is as follows: In a given full cycle beginning after a zero-crossing that occurs at a first time (t1) to begin the full cycle, then for an observed indication (I) of a zero-crossing during that full cycle, and at a second time (t2), the amount of time between t1 and t2 (i.e. t2−t1) is divided by 2 to obtain a purported new half cycle time ($HC_{New}$) of the waveform. A check is made as to whether that purported new half cycle time ($HC_{New}$) is less than some fraction (F) of a previously calculated half-cycle time ($HC_{Previous}$), for instance the half cycle time of the prior full cycle, as one example. If the purported new half cycle time is less than the fraction of that previously calculated half-cycle time (i.e. $HC_{New}<F*HC_{Previous}$), then the observed indication (I) of the zero-crossing is ignored. This may be repeated for any number of observed indications of zero-crossings during that given full cycle. An example such fraction F is 15/16, or 93.75%.

As noted, the dimmer microprocessor can be used to determine when the load should be switched on and off to achieve the desired power output thereto. Based on the desired output, the microprocessor can determine the points on the AC waveform where the power to the load should be switched on or off as a fraction of the half cycle time of the AC waveform. These fractions can then be converted to times relative to the zero-crossing references by multiplying the fractions by the half cycle time of the AC waveform. Dimming curves, for instance, can be used for dimmer load control to indicate when to turn the switching circuit on and off depending on the desired brightness setting(s). In this regard, dimming curves can be preprogrammed and dictate the control parameters that a dimmer selects in response to control signal input. The relationship between actual brightness output of a load and the control signal input level/value may not be linear, though in some examples it may be. In other examples, there is a logarithmic or 'square' relationship. Other relationships are possible. Sets of dimming curves can be used to match the light output of different bulb types. For example, the light output of some bulb types might be a linear function of the power applied to them while the light output of other bulb types might be non-linear or logarithmic, as examples. Selection of the appropriate curve can be used to ensure that a control setting of 50% would be half the light output of a control setting of 100%, for instance.

Figure 7:
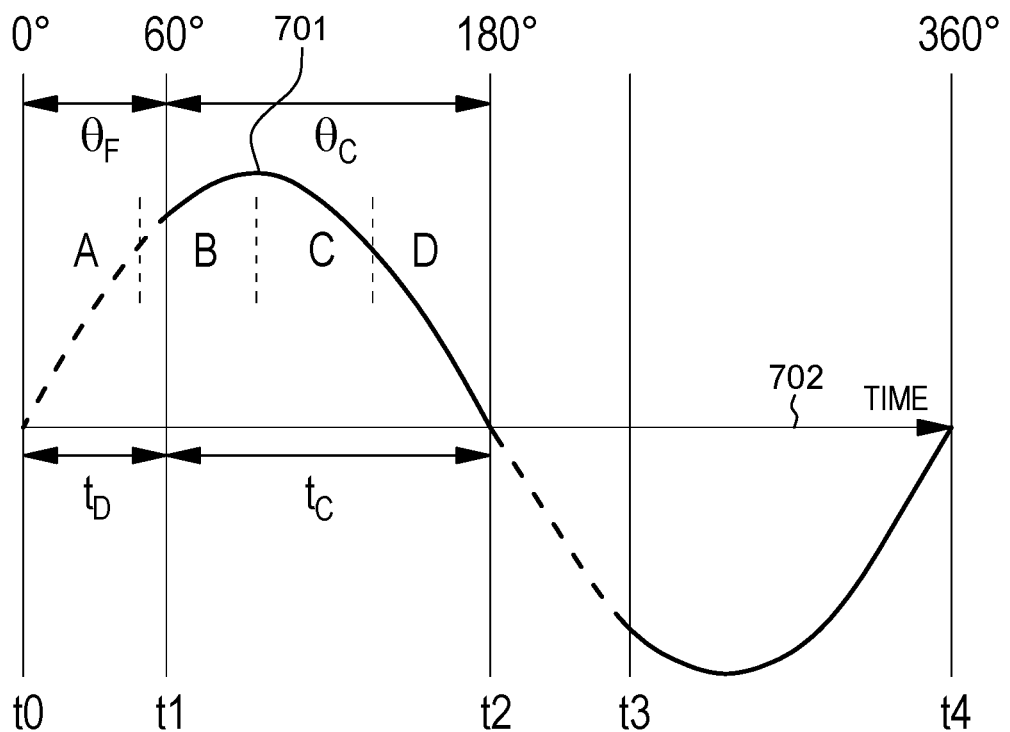
FIG. 7 is a timing diagram illustrating example electrical load control.
Figure 7:
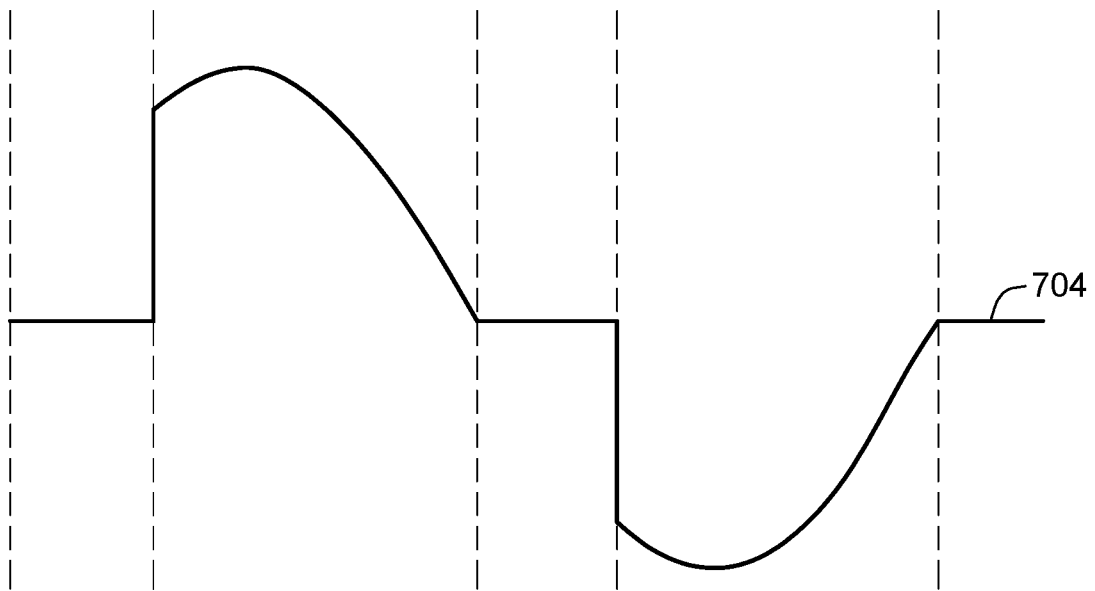

FIG. 7 is a timing diagram illustrating example of an electrical load control using forward phase dimming. The firing angle in the example is determined to be 60 degrees based on the user's desired brightness level. The phase-controlled input line voltage 701 is depicted by timeline 702 as the x-axis. As noted previously, each input line voltage full cycle of the AC power source can have a positive half cycle beginning at a first zero-crossing time (e.g. t0) and ending at a midpoint (positive to negative) zero-crossing time (e.g. t2). The input line voltage cycle then has a negative half cycle beginning at time t2 and ending at another zero-crossing at time t4. For 60 Hz electrical power the cycle from t0 to t4 nominally lasts 1/60th of a second, thus a half cycle nominally lasts 1/120th of a second.

During a delay period tD (i.e. the time period between t0 and t1) from a zero-crossing, the switching circuit (switch) remains OFF (unlatched). Then at time t1 the switch can be turned ON (latched) resulting in the input line voltage being delivered to load with a return path of current to the neutral line. The voltage waveform 701 in FIG. 7 is expressed using dashed line segments representing time periods during which the switch is unlatched and solid line segments representing time periods during which the switch is latched. Plot 704 illustrates voltage being delivered to the load under a phase control depicted by timeline 702. The switch can be self-commutating such that the switch stops conducting when current through the switch falls below the holding current level. When the current through the switch falls below its holding current level, the switch can turn OFF again so that voltage will no longer be applied to load. As depicted, the switch can turn OFF at time t2 (about the zero-crossing time) and can be turned ON again (latched) at time t3 after a delay period lasting from the zero-crossing at time t2 until time t3.

A dimmer circuit can be configured to operate with a firing angle θF and a conducting/conduction angle θC. A firing angle θF of the dimmer circuit is the time (tD) expressed in degrees per half cycle that the switch is OFF after a zero-crossing time so that power is not delivered to a load. A conduction angle θC of the dimmer circuit is the time (tC) expressed in degrees that the switch is ON so that power is delivered to the load. The firing angle and conduction angle in this context may correspond to a conduction start angle (angle, of the half-phase, at which the switching circuit is switched to the ON state to conduct the supply of power to the lighting load) and a conduction end angle (angle, of the half-phase, at which the switching circuit is switched to the OFF state to cease conducting the supply of power to the lighting load).

When a user adjusts a dimming level of the dimmer circuit using user interface(s)/actuator(s), the firing angle θF and conduction angle θC of the dimmer circuit change. A dimmer circuit can have a non-conducting period in which the dimmer circuit is not providing power to the load for the time tD prior to an initial firing of the switch to latch the switch during a half cycle. The dimmer circuit has a conducting period that can be active for the time tC after an initial firing of the switch during the half cycle. For dimming where the non-conduction period is relatively short (i.e. high brightness), the dimmer circuit can switch OFF power delivery to the load for only small portions of a cycle—portions extending relatively short durations of time from a zero-crossing. For dimming where the non-conduction period is relatively long (lower brightness), the dimmer circuit can switch OFF power delivery to the load for longer times extending from a zero-crossing. In an example in which maximum brightness is desired, the controller can fire the switch circuit virtually immediately when the controller receives the indication that a zero-crossing has occurred so that the switch can be latched for the longest possible period of time before the power phase again transitions to a next half cycle. In contrast, a longer delay in firing the switch after a zero-crossing might maintain the switch in an ON state for a lesser duration of time during the half cycle before the next transition, and will result in less current draw and, in the case of a light source, a dimmer light. A control of the dimmer circuit to increase brightness reduces a firing angle θF and increases a conduction angle θC. A control of the dimmer circuit to decrease brightness increases a firing angle θF of the dimmer circuit and decreases a conduction angle θC.

The 'output compare' feature of a microprocessor's timer subsystem can be used to accurately switch the switching circuit on and off at desired times. The output compare can be set to control the output at the appropriate time during the first half cycle after a zero-crossing reference by adding the calculated on or off time relative to the zero-crossing reference to the time of the zero-crossing reference. The output compare can be set to control the output at the appropriate time during the next half cycle by adding the calculated half cycle time and the calculated on or off time relative to the zero-crossing reference to the zero-crossing reference.

Accordingly, as described herein, frequency adaptive load control is provided to control power to a load responsive to variations in line frequency. The frequency is accurately and repeatedly measured and used in continually updating when the switching circuit is to be fired.

In accordance with further aspects, the duration of a control pulse, in which a control signal remains in an ON state to fire the switching circuit, can be selectively controlled based on a desired brightness setting of the dimmer. Many electronic lighting dimmers vary brightness by varying the point in the AC waveform when a suitable control signal is applied to the switching circuit, for instance to the gate of the TRIAC. In the example of a TRIAC, switching the TRIAC on shortly after the zero-crossing of the AC waveform results in the brightest output. Delaying the turn on of the TRIAC to later in the AC waveform half cycle results in lower output. Achieving the minimum brightness supported by modern lighting devices, such as those utilizing LEDs, requires switching the TRIAC on relatively late in the half cycle.

Once the TRIAC is switched on, it stays latched throughout the remainder of the half cycle. Sometimes, though, the lighting load is such that the TRIAC will not reliably switch on with a single pulse. To deal with this, some dimmers can apply a series of pulses to the gate or apply a continuous signal to the gate of the TRIAC until shortly before the next zero-crossing of the AC waveform.

Figure 8:
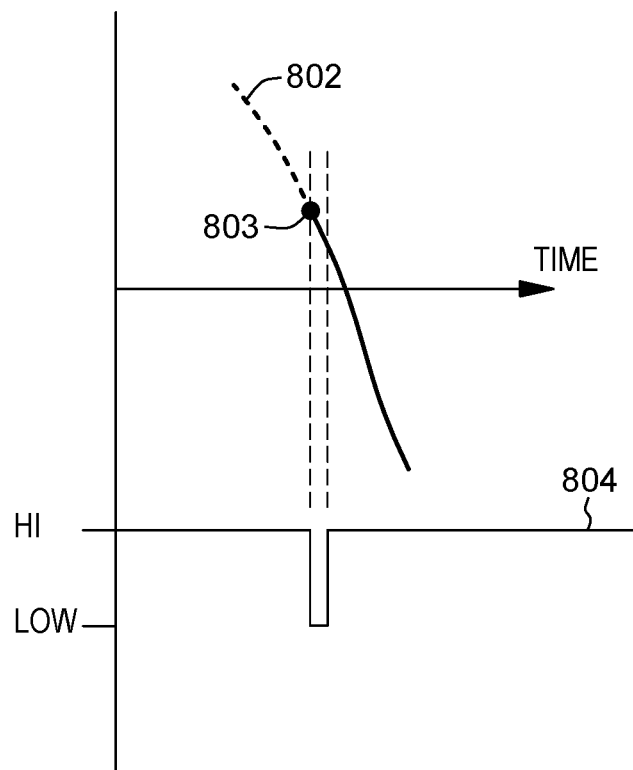
FIG. 8 illustrates a partial AC waveform and control signal in which a switching circuit remains in a conductive state through a zero-crossing, longer than the control signal to the switching circuit is held in its ON state.

If the control signal to the gate is applied too late in the AC half cycle (i.e. too close to the next zero-crossing), it is possible for the TRIAC to remain on throughout the entire next half cycle, resulting in maximum output or bright flashes rather than the desired minimum dimming level. Generally the closer to the end of the half cycle that firing occurs, the more risk there is, particularly with certain loads such as LEDs, that the TRIAC fails to unlatch as the AC wave transitions through zero and into the next half-phase. It is noted that there is typically some set minimum amount of time ("minimum on-time") for which the control signal is to be held in the ON state to ensure reliable firing of the switching circuit. Consequently, firing too late in the half cycle can mean that the control signal, when held for the minimum on time, is applied too late in the phase such that the switch does not unlatch during the half-cycle. FIG. 8 illustrates a partial AC waveform and control signal in which a switching circuit remains in a conductive state through a zero-crossing, longer than the control signal to the switching circuit is held in its ON state. Waveform 802 is shown transitioning through zero from a positive half cycle to a negative half cycle (i.e. a negative-going zero-crossing). 804 depicts an example signal state waveform for the control signal as a timing diagram relative to waveform 802 for firing the switching circuit. Here, the control signal has an ON state represented by a LOW signal, and an OFF state represented by a HI signal. The control signal falls from HI to LOW to fire the switching circuit. This occurs at point 803 of the waveform. The solid portion of the AC waveform 802 represents when the switching circuit is conducting power to the load. Even though the control signal has a relatively short duration in the ON state, lasting until approximately the point of zero-crossing, here the switching circuit fails to unlatch and therefore power is conducted to the load through the zero crossing, at least for the start of the negative half cycle and potentially until the end of the negative half cycle.

This issue can also arise, regardless of the firing angle, when holding the control signal in the ON state until too late in the half cycle. Sometimes the switching circuit fails to unlatch when it is held latched too late in the half cycle. This can be load or installation-dependent and unpredictable.

Aspects presented herein seek to optimize the ability to dim a wide variety of lighting loads to their minimum brightness while minimizing the possibility of the load remaining on at maximum brightness or flashing. This is achieved by varying the 'turn-off time' at which to turn the control signal to the OFF state. When possible, based on the desired brightness of the light, the control signal to the gate of the TRIAC can be switched off earlier in the half cycle than it would be for other brightness levels. Specifically, for a range of desired load level settings, or brightnesses in the case of lighting loads, the turn-off time can be set to a default turn-off time for turning the control signal to the OFF state. This can be a relatively conservative turn-off time chosen to avoid the above-noted issues for most loads. In contrast, when a desired load level setting is sufficiently low that the control signal to the gate of the TRIAC is to be switched OFF later in the half cycle than the default turn-off time, on account of the required minimum on time needed to reliably fire the switching circuit, the turn-off time can be selected to be later than the default turn-off time. In this manner, there is some point at which the brightness level setting may be low enough that to hold the control signal ON for the minimum duration needed to fire the switching circuit would mean that the control signal is held ON past the default turn-off time. In this case, the actual turn-off time may be pushed out to accommodate this. At some sufficiently delayed firing angle, undesirable behavior for a specific lighting load may be observed and indicated by a user or automatically determined by the dimmer circuitry. In this case, the 'minimum brightness level' for that specific lighting load can be adjusted upward. This can be load-specific and therefore not affect the ability of the dimmer to dim other lighting loads to lower levels. If the lighting load were replaced with a different one, then this minimum brightness setting can be adjusted accordingly. Similarly, a given lighting load may perform differently in different installations, and an adaptive turn-off time as disclosed herein may be utilized in these situations as well.

This approach can be useful in applications where the power delivered to a connected load is to be controllable over a wide range, but where varying loads could affect the ability to control all loads reliably over the entire range. Typical applications would be TRIAC-based lighting dimmers, as examples.

Approaches described herein can control the switching of a TRIAC (or other type of switching circuit) to maximize a range of control of the attached load. A typical application would be to optimally switch a lighting load to achieve the full brightness and a minimum brightness of that load that avoids undesirable behavior.

Conventionally, TRIACs have been controlled by pulsing the gate control signal one or more times or by turning the control signal on and only turning it off a fixed time shortly before the next zero-crossing of the AC waveform. If the control signal is turned off too late in the half cycle, regardless of when it was turned on, different lighting loads can sometimes affect the switching of the TRIAC and result in the TRIAC remaining on throughout the next half cycle, resulting in maximum output or bright flashes, rather than the desired minimum level. This is what is depicted by FIG. 8 and explained above.

To prevent this from happening, an approach conservatively turns off the control signal earlier in the half cycle than is typically necessary. The turn off time is set conservatively earlier than the end of the half cycle in order to reliably control a wide variety of loads. This results in many dimmers not being able to dim certain lighting loads to the lowest brightness possible, but avoids undesirable behavior. Aspects presented herein seek to improve upon this by selectively allowing a control signal pulse width to vary and the control signal to be turned off later than the fixed or default turn off time, particularly when it is desired to allow lower dimming levels to be achieved without compromising the dimmer's control of other lighting loads.

Thus, based on a desired brightness of the lighting load, the dimmer microprocessor turns on the control signal to the gate of the switching circuit at the appropriate time. A default turn-off time is set such that, when possible, the control signal is not turned off until the default turn-off time predetermined to be early enough in the half cycle to prevent undesirable behavior in most lighting loads, yet late enough to enable a minimum-duration control signal pulse width. In this regard, and as noted above, the microprocessor can maintain a minimum on-time, or control signal pulse duration/width, for which the control signal to the switching circuit is to remain in an ON state to fire the switching circuit, where the switching circuit is selectively controlled by varying the control signal between the ON state, in which the switching circuit conducts the supply of AC power to the load, and an OFF state. The control signal pulse duration/width may also be referred to as the gate pulse time/duration. An example such minimum on-time is 1 millisecond (ms), though in general it may be set at whatever minimum duration reliably turns on the particular switching circuit of the dimmer.

Based on the desired load level setting of the electrical load controller (for instance, brightness setting in the case of a lighting load dimmer), the microcontroller determines a corresponding control signal turn-on time at which to turn the control signal to the ON state to conduct the supply of AC power to the load. This control signal turn-on time corresponds to a first firing angle at which to fire during half cycles of the AC power. The microprocessor can add the predetermined minimum on-time to that control signal turn-on time selected based on the desired brightness setting, to obtain a potential control signal turn-off time to turn the control signal to the OFF state. If this potential control signal turn-off time is earlier than the predetermined default turn-off time, the control signal is not turned off until the predetermined default turn-off time, i.e. it is held in the ON state until the default turn-off time in order to intentionally extend the control signal pulse duration to longer than the minimum on-time. Maximizing the pulse width can increase the reliability of switching on the switching circuit.

Figure 9:
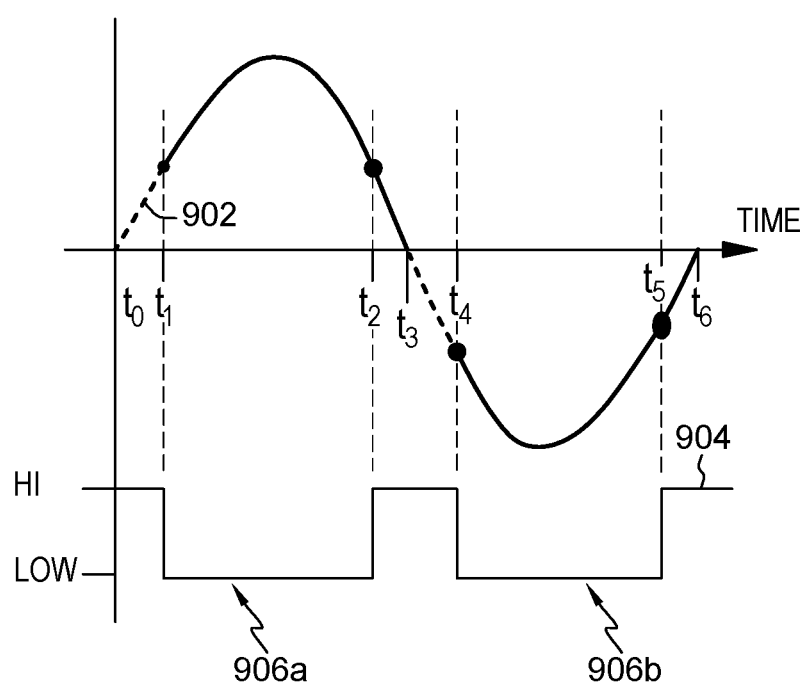
FIG. 9 depicts a partial AC waveform and control signal in which the control signal to a switching circuit is held in an ON state from a turn-on time to a default turn-off time for turning the control signal to an OFF state, in accordance with aspects described herein.

To illustrate, FIG. 9 depicts a partial AC waveform and control signal in which the control signal to a switching circuit is held in an ON state from a turn-on time to a default turn-off time for turning the control signal to an OFF state, in accordance with aspects described herein. A full cycle of waveform 902 is shown starting at time t0, transitioning through a negative-going zero-crossing at time t3 and completing at time t6. 904 depicts an example signal state waveform for the control signal as a timing diagram relative to waveform 902 for firing the switching circuit. Again as in FIG. 8, the control signal varies between HI and LOW states. The ON state is represented by a LOW signal, and the OFF state is represented by a HI signal. The solid portion of the AC waveform 902 represents when the switching circuit is conducting power to the load. It is noted that while the control signal returns to the OFF state at times t2 and t5, in this example the conduction period extends until the end of each half cycle. Some types of switching circuits, such as a TRIAC as is the case in this example, generally remain latched until line voltage drops to some relatively low value at or near the zero-crossing.

Based on the user's desired brightness setting, it is determined to fire the switching circuit at a particular firing angle, corresponding in the positive half cycle to time t1 after some delay extending from time t0 to time t1 and correspondingly in the negative half cycle to time t4 after some delay extending from time t3 to time t4. The control signal to the switching circuit therefore is set to fall from HI to LOW at times t1 and t4 to fire the switching circuit. If the minimum control signal pulse duration is 1 ms, the pulse widths 906a, 906b would be relatively thin. However, in accordance with the aspects described above, the control signal is held in the ON state until the default control signal turn-off time, which in this example corresponds to times t2 and t5. These times are conservative values for when to switch off the switching circuit in order to avoid the problems discussed above. The pulse durations 906a, 906b are therefore significantly longer than the minimum control signal pulse duration.

Referring back to the above where the microprocessor adds the predetermined minimum on-time to the control signal turn-on time to obtain the potential control signal turn-off time: if this potential control signal turn-off time is instead later than the predetermined default turn-off time, the control signal may be turned off at this later turn-off time. In other words, if the selected control signal turn-on time is sufficiently late that maintaining the control signal in the ON state for the minimum on-time exceeds the default turn-off time, the control signal may nonetheless be held ON past the default turn-off time to the calculated turn-off time.

Figure 10:
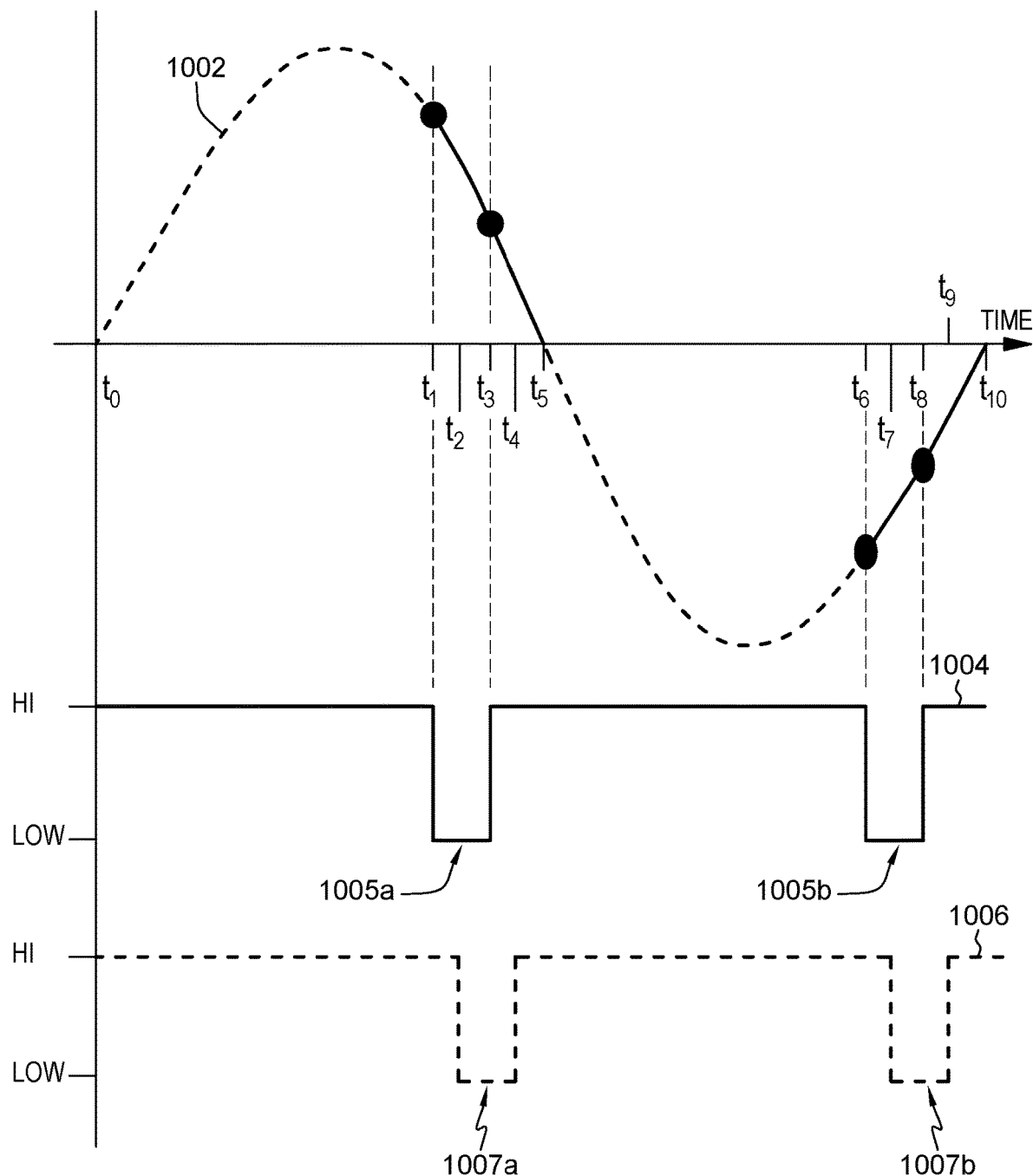
FIG. 10 depicts a partial AC waveform and control signal illustrating holding the control signal to a switching circuit in an ON state for a minimum on-time that extends from a turn-on time to a turn-off time that is past a default turn-off time for turning the control signal to an OFF state, in accordance with aspects described herein.

FIG. 10 depicts a partial AC waveform and control signal illustrating holding the control signal to a switching circuit in an ON state for a minimum on-time that extends from a turn-on time to a turn-off time that is past a default turn-off time for turning the control signal to an OFF state, in accordance with aspects described herein. A full cycle of waveform 1002 is shown starting at time t0, transitioning through a negative-going zero-crossing at time t5 and completing at time t10. Assume time t3 represents the default turn-off time in the positive half cycle and time t8 represents the default turn-off time in the negative half cycle. Assume further that the minimum on-time for the control signal to remain in the ON state is equal to the amount of time from time t1 to time t3 (exaggerated in this example), which matches the amount of time from time t6 to time t8. Times t1 and t6 are therefore the latest possible times to fire the switching circuit in the positive and negative half cycles, respectively, such that maintaining the control signal for the minimum duration in the ON state does not exceed the default turn-off time. The solid portion of the AC waveform 1002 represents when the switching circuit is conducting power to the load in that scenario, and 1004 is the corresponding control signal presented as a timing diagram relative to waveform 1002. The control signal is turned to the ON state (falls LOW) at time t1 and is held in the ON state for the minimum on-time/pulse width 1005a until the default turn-off time in the half cycle, represented by time t3 in this positive half cycle. Similarly in the negative half cycle, the control signal is turned to the ON state (falls LOW) at time t6 and is held in the ON state for the minimum on-time/pulse width 1005b until the default control-signal turn-off time in the half cycle, represented by time t8 in this negative half cycle.

Firing according to the timing of 1004 supplies a given amount of power to the electrical load. Shifting the control signal pulse slightly later in each half cycle would provide a lower load level. In the case of a lighting load, this results in a lower brightness, or dimming, level which can be desirable. However, shifting the firing times (t1, t6) any later while still turning off at the default turn-off times (t3 and t8, respectively), would result in a pulse width that is smaller than the minimum ON time, or pulse width, needed to reliably fire the switching circuit. This could result in a missed fire and no delivery of power to the load during the half cycle.

In accordance with aspects described herein, the turn-off time can be selectively delayed when the desired turn-on time, based on the desired dimming level, is sufficiently late in the half cycle, e.g. later than time t1. This can be done to maintain the minimum control pulse duration and thereby continue to reliably fire the switching circuit.

The dimmer may have a setup mode in which a user, possibly facilitated via a mobile application, cloud application programming interface (API), and/or web application/interface as examples, sets/programs a minimum dimming level thereof with a particular lighting load installed and being controlled by the dimmer. The user can be instructed to gradually decrease brightness. This lengthens the firing delay in each half cycle, delaying the control signal turn-on time in each half cycle. By the approach described above with reference to FIG. 9, the microcontroller can lengthen the control signal pulse duration such that it is held to the default turn-off time. At some point as the user gradually decreases brightness the control signal pulse duration reaches the minimum on-time for which the control signal (e.g. 1004 of FIG. 10) is to remain in the ON state. From that point, as the user continues to gradually decrease brightness, the control signal turn-on and turn-off times shift later and in-parallel with each other in order to maintain the minimum pulse duration. Even though the control signal pulse duration remains the same as the turn-on and turn-off times shift later in the half cycle, brightness continues to decrease on account of the lower voltage levels of the AC waveform as the firing shifts more toward the zero-crossing (e.g. later in the half cycle).

1006 is an example signal state waveform for the control signal in which the pulse has been shifted in this manner to later in the half cycle. Here, the brightness level has been decreased in comparison to the brightness associated with the control signal pulsing of 1004. The turn-on time for each half cycle shifts later (i.e. to times t2 and t7 respectively), the turn-off time for each half cycle shifts later by an equal amount (i.e. to times t4 and t9 respectively), and each pulse width 1007a, 1007b remains the same as that of 1005a, 1005b, which is the minimum control signal pulse duration.

At some point in shifting the pulse increasingly later in the half cycle, degraded dimming performance—flickering for instance—may be realized. The user could detect this, or the microcontroller could be configured to detect this or another issue indicative of an undesirable firing schedule. When that point is realized, the current (i.e. set; configured; present) turn-on time is a point at which the effective limit on the minimum desired dimming level has been exceeded. The latest 'allowable' turn-on time for non-degraded performance can be set to some point prior than the current, problematic, turn-on time. For instance, the latest turn-on time can be set to some predetermined amount of time prior to the current turn-on time. That enables the control signal to fire at a latest possible time and still hold the control signal in the ON state for the minimum on-time to provide non-degraded performance.

Thus, in operation of the dimmer, a process performed by the microcontroller can determine two potential turn-off times for turning the control signal to the OFF state: a first turn-off time that is equal to the set turn-on time (a function of the current brightness setting) plus the minimum on-time, and a second turn-off time that is equal to a default turn-off time. The microcontroller can then select from those two to select the control signal turn-off time at which to actually turn the control signal to the OFF state. That selected control signal turn-off time corresponds to an angle of half cycles of the AC power at which to cease holding the control signal in the ON state. The selecting can select, as the control signal turn-off time, a later of the first and second potential turn-off times.

At this point, with the minimum pulse duration, the determined turn-on time and selected turn-off time, the microcontroller controls the supply of AC power to the load by selectively controlling the switching circuit to conduct the supply of AC power to the load, in which it turns the control signal to the ON state at the set control signal turn-on time during each half cycle and holds the control signal in the ON state until the selected control signal turn-off time during the half cycle. If at some point a user changes the desired load level setting, the process above can repeat, i.e. by setting the corresponding control signal turn-on time, selecting a control signal turn-off time, and holding the control signal in the ON state until the selected control signal turn-off time.

If dimming a particular lighting load to a given level results in undesirable behavior, for example flickering and/or failure of the TRIAC to unlatch before a zero-crossing, a minimum dim level can be set for that lighting load as described above. In particular, the minimum dim level, corresponding to the latest selectable control signal turn-off time, is set to some level slightly greater than the given level that is producing the undesirable behavior. The latest selectable control signal turn-off time is set to some predefined amount of time earlier than the current turn-off time.

Thus, in the process above, if the first turn-off time (the set turn-on time plus the minimum on-time) is later than the second turn-off time (the preconfigured default) and the first turn-off time is selected as the control signal turn-off time to use, a process can receive from a user an indication of a problem with the load after turning the control signal to the ON state at the set control signal turn-on time and holding the control signal in the ON state until the first turn-off time. Based on this, the process sets a latest control signal turn-on time for turning the control signal to the ON state, where the latest control signal turn-on time is set to a time prior to the currently set control signal turn-on time. In particular examples where the electrical load controller is a dimmer and the load is a lighting load, the receipt of this indication and the setting of the latest control signal turn-on time are performed in a setup mode of the dimmer to establish a minimum available brightness to which to dim the lighting load. This will cause the control signal to the switching circuit to be turned off earlier, eliminating flashing and/or other undesirable behavior. In some examples, this is facilitated and accomplished using a mobile application, a cloud API, and/or web application/interface, as examples, to control this setting.

Figure 11:
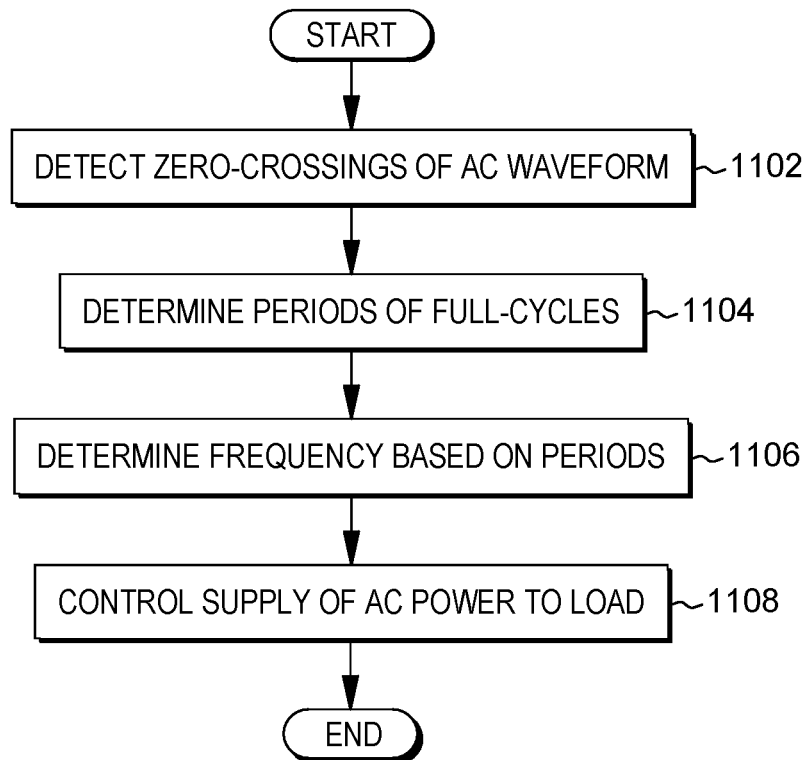
FIG. 11 depicts an example process for frequency adaptive load control in operating an electrical load controller, in accordance with aspects described herein.
Figure 12:
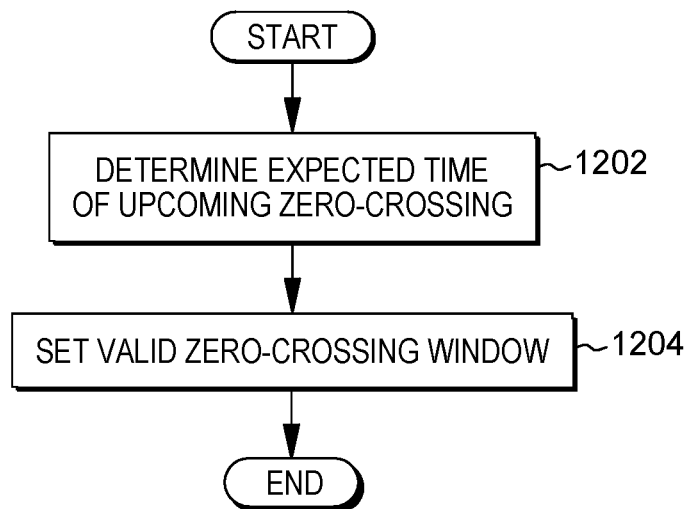
FIG. 12 depicts an example process for windowing zero-crossing detection, in accordance with aspects described herein.
Figure 13:
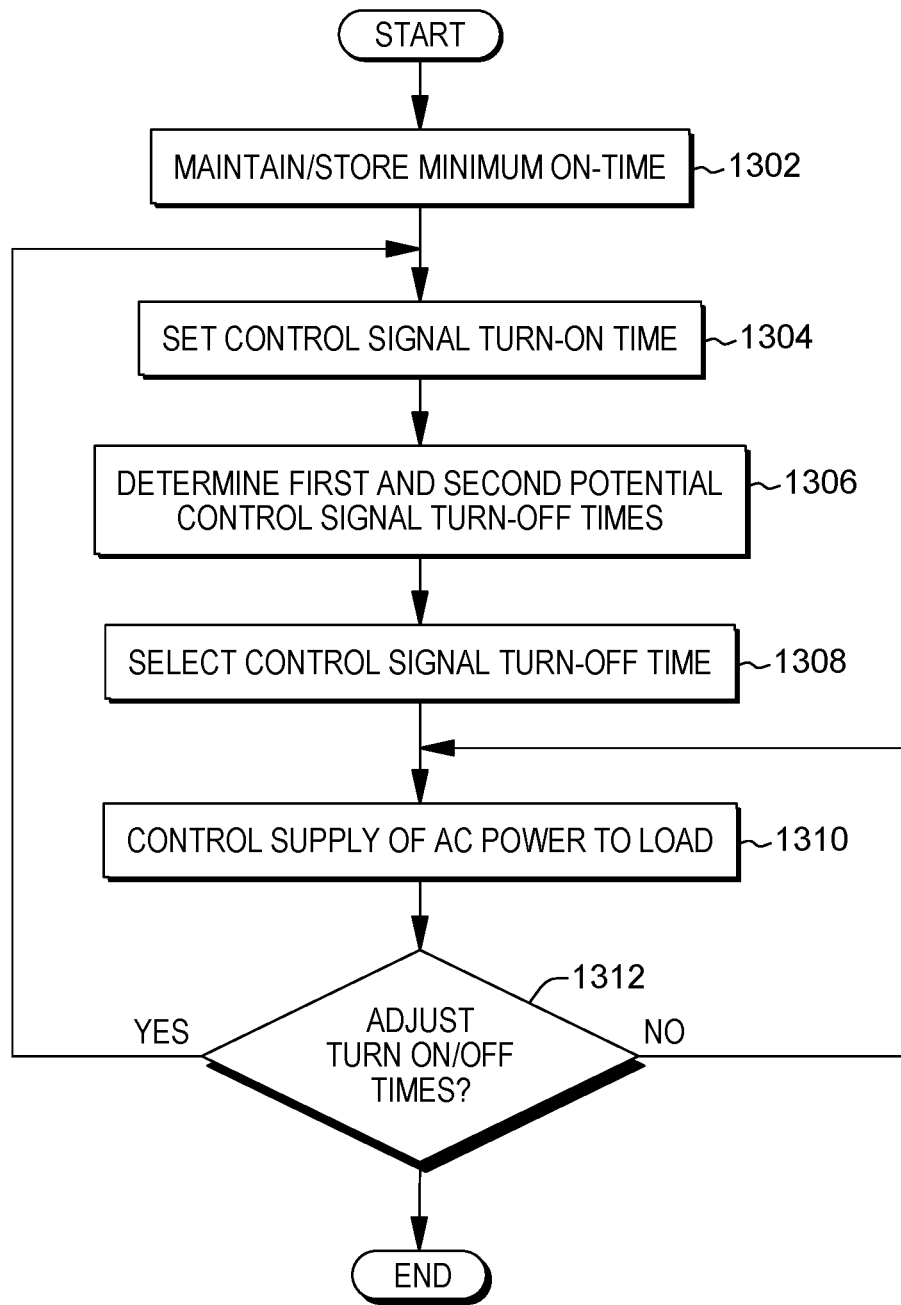
FIG. 13 depicts an example process for improved switching in operating an electrical load controller, in accordance with aspects described herein.

FIGS. 11-13 depict example processes described herein. The processes can be performed by one or more apparatuses, such as a dimmer or other electrical load controller as described herein. The electrical load controller can be for controlling conduction of a supply of power to an electrical load, such as a lighting load. The electrical load controller can include a line input terminal and a load output terminal, the line input terminal configured to be electrically coupled to a supply of alternating current (AC) power, and the load output terminal configured to be electrically coupled to a load. The electrical load controller can further include a switching circuit electrically coupled in series between the line input terminal and the load output terminal, and the switching circuit can be configured to be selectively controlled by varying a control signal between an ON state, in which the switching circuit conducts the supply of AC power to the load, and an OFF state.

In particular, FIG. 11 depicts an example process for frequency adaptive load control in operating an electrical load controller, in accordance with aspects described herein. The process of FIG. 11, or aspects thereof could be performed continuously, periodically, or aperiodically across the duration of one or more full cycles of the AC waveform. The process detects (1102) zero-crossings of an alternating current (AC) waveform of a supply of AC power. The AC waveform oscillates though full cycles, each full cycle including a positive half cycle and a negative half cycle of the AC waveform. The detected zero-crossings are zero-crossings of the AC waveform at half cycles, or full cycles, consecutive or non-consecutive. The detected zero-crossings of the AC waveform can be detected from (i) transitions from a HI state of a zero-crossing signal to a LOW state of the zero-crossing signal, wherein transitions of the zero-crossing signal from the LOW state to the HI state are ignored or discarded, or (ii) transitions from a LOW state of a zero-crossing signal to a HI state of the zero-crossing signal, wherein transitions of the zero-crossing signal from the HI state to the LOW state are ignored or discarded, as examples. In some embodiments, the detected zero-crossings of the AC waveform all occur at either negative-going transitions or positive-going transitions of the AC waveform. Detecting the zero-crossings can be by receiving an input by a microprocessor of the electrical load controller. The microprocessor can be configured to detect the zero-crossings (i) at the negative-going transitions and ignore the positive-going transitions of the AC waveform, or (ii) at the positive-going transitions and ignore the negative-going transitions of the AC waveform.

The process continues by determining (1104), using the detected zero-crossings, a plurality of periods, each period of the plurality of periods corresponding to a respective full cycle of a plurality of full cycles of the AC waveform. The full cycles could be consecutive full cycles of the AC waveform, though they may be non-consecutive or a mixture of both. The determined periods could be a fixed number of periods (for example 10) of a plurality of most recent full cycles of the AC waveform.

The process determines (1106) a frequency of the AC waveform based on the determined plurality of periods of the full cycles of the AC waveform. In some examples, the determined frequency of the AC waveform is determined from a median value of the determined periods. Additionally or alternatively, a determined frequency of the AC waveform could be determined from an average of the determined periods.

The process controls (1108) a supply of AC power to the load based on the determined frequency of the AC waveform. The controlling uses the determined frequency to fire the switching circuit of the electrical load controller in (each of) a plurality of half cycles of the AC waveform, in order to selectively control the switching circuit to conduct the AC power to the load. The controlling could use the determined frequency to tailor the specific turn-on and turn-off times based thereon, and vary those turn-on and turn-off times as frequency varies, so that the turn-on/turn-off phase angles remain consistent in the face of changing line frequency. Thus, the process can use a determined frequency to determine a half cycle time of the AC waveform and determine from the half cycle time points of the AC waveform when the AC power to the load is to be switched on or off.

This process can loop back to 1102 and iterate any number of times. It could repeat every n number of full cycles where n>=1, for example, to repeatedly perform, across a duration of time during which the electrical load controller is turned on to selectively control the switching circuit to conduct the AC power to the load, the detecting zero-crossings (1102), the determining a plurality of periods of full cycles (1104), the determining a frequency of the AC waveform (1106), and the controlling power to the load based on the determining frequency (1108). The process can end when the electrical load controller is turned off.

FIG. 12 depicts an example process for windowing zero-crossing detection, in accordance with aspects described herein. This can be performed in conjunction with the process of FIG. 11 to improve detection of actual, as opposed to false-positive, zero-crossing indications. The process of FIG. 12, or aspects thereof, could be performed continuously, periodically, or aperiodically during each of one or more half cycles of the AC waveform. In a particular example, it is performed in each half cycle of a plurality consecutive or non-consecutive half cycles of the AC waveform. The process determines (1202) an expected time of an upcoming zero-crossing of the AC waveform that transitions from a first full cycle to a second full cycle. Determining the expected time can include adding a calculated period of the determined frequency (e.g. determined at 1106) to a time of a most-recently detected zero-crossing. Then based on the expected time of the upcoming zero-crossing, the process can set (1204) a window of time during which a zero-crossing indication of a zero-crossing signal of the electrical load controller is taken as being valid. By setting this window, zero-crossing indications, of the zero-crossing signal, occurring prior to the window of time during the current full or half cycle can be ignored. The set window can be configured to extend from a defined amount of time before the expected time of the zero-crossing to a defined amount of time after the expected time of the zero-crossing, and the expected time need not be the midway point between the beginning and end of the window.

FIG. 13 depicts an example process for improved switching in operating an electrical load controller, in accordance with aspects described herein. The electrical load controller includes a line input terminal and a load output terminal, the line input terminal configured to be electrically coupled to a supply of alternating current (AC) power, and the load output terminal configured to be electrically coupled to a load. A switching circuit is electrically coupled in series between the line input terminal and the load output terminal, and the switching circuit is configured to be selectively controlled by varying a control signal between an ON state, in which the switching circuit conducts the supply of AC power to the load, and an OFF state. The process of FIG. 13, or aspects thereof could be performed continuously, periodically, or aperiodically across the duration of one or more full cycles of the AC waveform. The process includes maintaining (1302) or storing a minimum on-time (also referred to as a pulse length or duration) for which the control signal to the switching circuit of the electrical load controller is to remain in the ON state to fire a switching circuit of the electrical load controller. Based on a desired load level setting of the electrical load controller, for instance the brightness setting for a dimmer, the process sets (1304) a corresponding control signal turn-on time to turn the control signal to the ON state to conduct the supply of AC power to the load. The control signal turn-on time corresponds to a first firing angle of half cycles of the AC power. The turn-on time therefore represents the point during each half cycle when it is desired to fire the switching circuit.

The process determines (1306) a first turn-off time equal to the set turn-on time plus the minimum on-time and a second turn-off time equal to a default turn-off time for turning the control signal to the OFF state, then selects (1308) a control signal turn-off time to turn the control signal to the OFF state as between the first turn-off time and the second turn-off time. The control signal turn-off time corresponds to a second firing angle of half cycles of the AC power. The selecting between the first and second turn-off times selects, as the control signal turn-off time, the later of the first turn-off time and the second turn-off time.

With the turn-on time and turn-off time selected, the process controls (1310) the supply of AC power to the load by selectively controlling the switching circuit to conduct the supply of AC power to the load. Controlling the supply of AC power to the load includes, based on turning the control signal to the ON state during a half cycle of the AC power at the set control signal turn-on time, holding the control signal in the ON state until the selected control signal turn-off time during the half cycle. A determination (1312) is made as to whether to adjust the turn on/off times. In some examples this is an explicit determination or check, though in other examples it may be implicitly determined that no adjustment is needed (1312, N) unless an interrupt or the like has been raised. Any of various factors can inform that such an adjustment is needed. One example is an indication that the user has changed the desired load level setting of the electrical load controller. Another example is an observed change in line frequency. In any case, if it is determined that no adjustment is to be made (1312, N), the process proceeds back to 1310 and controls supply of the AC power to the load using the configured control signal turn-on and turn-off times. Otherwise, an adjustment is to be made (1312, Y), for instance the user has changed the desired load level setting, in which case the process loops back to 1304 to repeat the setting and selecting of the control signal turn-on and turn-off times. Thus, based on a change, such as a user changing the desired load level setting of the electrical load controller, the process repeats the setting the corresponding control signal turn-on time (1304), the selecting a control signal turn-off time (1306), and the controlling (1310) which includes holding the control signal in the ON state until the selected control signal turn-off time. The process can end when the electrical load controller is turned off.

Additionally, as part of the process of FIG. 13 or another process, based on the first turn-off time being later than the second turn-off time and on selecting the first turn-off time to be the control signal turn-off time, the process can receive from a user an indication of a problem with the load after turning the control signal to the ON state at the set control signal turn-on time and holding the control signal in the ON state until the first turn-off time. Flicker, flashing, and sustained maximum brightness are all examples of such problems. Based on this, the process can set a latest control signal turn-on time for turning the control signal to the ON state, the latest control signal turn-on time being set to a time prior to the set control signal turn-on time. In cases where the electrical load controller is a dimmer and the load is a lighting load, this indication of the problem is received and the set of the latest control signal turn-on time are performed in a setup mode of the dimmer, facilitated and accomplished using a mobile application, a cloud API, and/or web application/interface, as examples, to establish a minimum available brightness to which to dim the lighting load.

Although various examples are provided, variations are possible without departing from a spirit of the claimed aspects.

Figure 14:
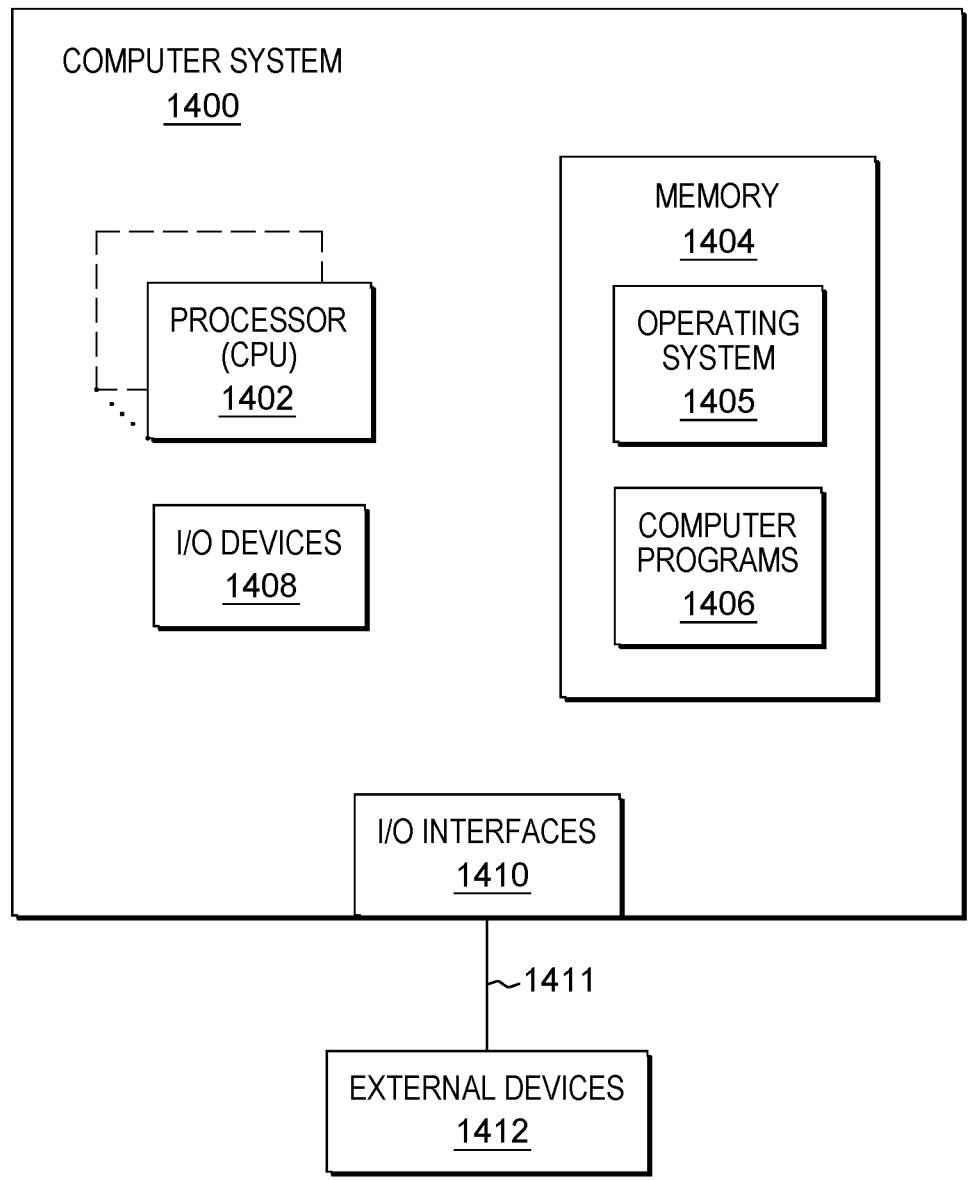
FIG. 14 depicts one example of a computer system and associated devices to incorporate and/or use aspects described herein.

Systems described herein, including those referred to herein as dimmers, may be regarded in some respects as a computer system capable of executing program instructions to perform processes/methods. Thus, processes as described herein may be performed by one or more computer systems, such as those described herein, which may include one or more dimmers/dimming systems and/or one or more computer systems of or connected thereto, such as one or more cloud servers, one or more user personal computers such as a smartphone, tablet, or other device, and/or one or more other computer systems. FIG. 14 depicts one example of a computer system and associated devices to incorporate and/or use aspects described herein. A computer system may also be referred to herein as a data processing device/system, computing device/system/node, or simply a computer. The computer system may be based on one or more of various system architectures and/or instruction set architectures.

FIG. 14 shows a computer system 1400 in communication with external device(s) 1412. Computer system 1400 includes one or more processor(s) 1402, for instance central processing unit(s) (CPUs). A processor can include functional components used in the execution of instructions, such as functional components to fetch program instructions from locations such as cache or main memory, decode program instructions, and execute program instructions, access memory for instruction execution, and write results of the executed instructions. A processor 1402 can also include register(s) to be used by one or more of the functional components. Computer system 1400 also includes memory 1404, input/output (I/O) devices 1408, and I/O interfaces 1410, which may be coupled to processor(s) 1402 and each other via one or more buses and/or other connections. Bus connections represent one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Memory 1404 can be or include main or system memory (e.g. Random Access Memory) used in the execution of program instructions, storage device(s) such as hard drive(s), flash media, or optical media as examples, and/or cache memory, as examples. Memory 1404 can include, for instance, a cache, such as a shared cache, which may be coupled to local caches (examples include L1 cache, L2 cache, etc.) of processor(s) 1402. Additionally, memory 1404 may be or include at least one computer program product having a set (e.g., at least one) of program modules, instructions, code or the like that is/are configured to carry out functions of embodiments described herein when executed by one or more processors.

Memory 1404 can store an operating system 1405 and other computer programs 1406, such as one or more computer programs/applications that execute to perform aspects described herein. Specifically, programs/applications can include computer readable program instructions that may be configured to carry out functions of embodiments of aspects described herein.

Examples of I/O devices 1408 include but are not limited to microphones, speakers, Global Positioning System (GPS) devices, cameras, lights, accelerometers, gyroscopes, magnetometers, sensor devices configured to sense light, proximity, heart rate, body and/or ambient temperature, blood pressure, and/or skin resistance, and activity monitors. An I/O device may be incorporated into the computer system as shown, though in some embodiments an I/O device may be regarded as an external device (1412) coupled to the computer system through one or more I/O interfaces 1410.

Computer system 1400 may communicate with one or more external devices 1412 via one or more I/O interfaces 1410. Example external devices include a keyboard, a pointing device, a display, and/or any other devices that enable a user to interact with computer system 1400. Other example external devices include any device that enables computer system 1400 to communicate with one or more other computing systems or peripheral devices such as a printer. A network interface/adapter is an example I/O interface that enables computer system 1400 to communicate with one or more networks, such as a local area network (LAN), a general wide area network (WAN), and/or a public network (e.g., the Internet), providing communication with other computing devices or systems, storage devices, or the like. Ethernet-based (such as Wi-Fi) interfaces and Bluetooth® adapters are just examples of the currently available types of network adapters used in computer systems (BLUETOOTH is a registered trademark of Bluetooth SIG, Inc., Kirkland, Wash., U.S.A.).

The communication between I/O interfaces 1410 and external devices 1412 can occur across wired and/or wireless communications link(s) 1411, such as Ethernet-based wired or wireless connections. Example wireless connections include cellular, Wi-Fi, Bluetooth®, proximity-based, near-field, or other types of wireless connections. More generally, communications link(s) 1411 may be any appropriate wireless and/or wired communication link(s) for communicating data.

Particular external device(s) 1412 may include one or more data storage devices, which may store one or more programs, one or more computer readable program instructions, and/or data, etc. Computer system 1400 may include and/or be coupled to and in communication with (e.g. as an external device of the computer system) removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media.

Computer system 1400 may be operational with numerous other general purpose or special purpose computing system environments or configurations. Computer system 1400 may take any of various forms, well-known examples of which include, but are not limited to, personal computer (PC) system(s), server computer system(s), such as messaging server(s), thin client(s), thick client(s), workstation(s), laptop(s), handheld device(s), mobile device(s)/computer(s) such as smartphone(s), tablet(s), and wearable device(s), multiprocessor system(s), microprocessor-based system(s), telephony device(s), network appliance(s) (such as edge appliance(s)), virtualization device(s), storage controller(s), set top box(es), programmable consumer electronic(s), network PC(s), minicomputer system(s), mainframe computer system(s), and distributed cloud computing environment(s) that include any of the above systems or devices, and the like.

Embodiments of the present disclosure may be a system, a method, and/or a computer program product, any of which may be configured to perform or facilitate aspects described herein.

In some embodiments, aspects of the present disclosure may take the form of a computer program product, which may be embodied as computer readable medium(s). A computer readable medium may be a tangible storage device/medium having computer readable program code/instructions stored thereon. Example computer readable medium(s) include, but are not limited to, electronic, magnetic, optical, or semiconductor storage devices or systems, or any combination of the foregoing. Example embodiments of a computer readable medium include a hard drive or other mass-storage device, an electrical connection having wires, random access memory (RAM), read-only memory (ROM), erasable-programmable read-only memory such as EPROM or flash memory, an optical fiber, a portable computer disk/diskette, such as a compact disc read-only memory (CD-ROM) or Digital Versatile Disc (DVD), an optical storage device, a magnetic storage device, or any combination of the foregoing. The computer readable medium may be readable by a processor, processing unit, or the like, to obtain data (e.g. instructions) from the medium for execution. In a particular example, a computer program product is or includes one or more computer readable media that includes/stores computer readable program code to provide and facilitate one or more aspects described herein.

As noted, program instruction contained or stored in/on a computer readable medium can be obtained and executed by any of various suitable components such as a processor of a computer system to cause the computer system to behave and function in a particular manner. Such program instructions for carrying out operations to perform, achieve, or facilitate aspects described herein may be written in, or compiled from code written in, any desired programming language. In some embodiments, such programming language includes object-oriented and/or procedural programming languages such as C, C++, C#, Java, etc.

Program code can include one or more program instructions obtained for execution by one or more processors.

Computer program instructions may be provided to one or more processors of, e.g., one or more computer systems, to produce a machine, such that the program instructions, when executed by the one or more processors, perform, achieve, or facilitate aspects of the present disclosure, such as actions or functions described in flowcharts and/or block diagrams described herein. Thus, each block, or combinations of blocks, of the flowchart illustrations and/or block diagrams depicted and described herein can be implemented, in some embodiments, by computer program instructions.

Although various embodiments are described above, these are only examples. For example, computing environments of other architectures can be used to incorporate and use one or more embodiments.

Provided is a small sampling of embodiments of the present disclosure, as described herein:

A1. A method of operating an electrical load controller, the method comprising: detecting zero-crossings of an alternating current (AC) waveform of a supply of AC power, the AC waveform oscillating though full cycles, each full cycle comprising a positive half cycle and a negative half cycle of the AC waveform; determining, using the detected zero-crossings, a plurality of periods, each period corresponding to a full cycle of the AC waveform; determining a frequency of the AC waveform based on the determined plurality of periods of the full cycles of the AC waveform; and controlling a supply of AC power to a load based on the determined frequency of the AC waveform, wherein the controlling uses the determined frequency to fire a switching circuit of the electrical load controller in a plurality of half cycles of the AC waveform to selectively control the switching circuit to conduct the AC power to the load.

A2. The method of A1, wherein the full cycles are consecutive full cycles of the AC waveform.

A3. The method of A1, wherein the determined periods are a fixed number of periods of a plurality of most recent full cycles of the AC waveform.

A4. The method of A1, wherein the determined frequency of the AC waveform is determined from a median value of the determined periods.

A5. The method of A1, wherein the determined frequency of the AC waveform is determined from an average of the determined periods.

A6. The method of A1, wherein the controlling comprises: using the determined frequency to determine a half cycle time of the AC waveform; and determining, from the half cycle time, points of the AC waveform when the AC power to the load is to be switched on or off.

A7. The method of A1, further comprising: determining an expected time of an upcoming zero-crossing of the AC waveform that transitions from a first full cycle to a second full cycle, the determining the expected time comprising adding a calculated period of the determined frequency to a time of a most-recently detected zero-crossing; based on the expected time of the upcoming zero-crossing, setting a window of time during which a zero-crossing indication of a zero-crossing signal of the electrical load controller is taken as being valid, wherein one or more zero-crossing indications, of the zero-crossing signal, occurring prior to the window of time are ignored.

A8. The method of A7, wherein the window extends from a defined amount of time before the expected time of the zero-crossing to a defined amount of time after the expected time of the zero-crossing.

A9. The method of A1, wherein the detected zero-crossings of the AC waveform are detected from either: (i) transitions from a HI state of a zero-crossing signal to a LOW state of the zero-crossing signal, wherein transitions of the zero-crossing signal from the LOW state to the HI state are ignored or discarded; or (ii) transitions from a LOW state of a zero-crossing signal to a HI state of the zero-crossing signal, wherein transitions of the zero-crossing signal from the HI state to the LOW state are ignored or discarded.

A10. The method of A1, wherein the detected zero-crossings of the AC waveform all occur at either negative-going transitions or positive-going transitions of the AC waveform.

A11. The method of A10, wherein the detecting the zero-crossings is by receiving an input by a microprocessor of the electrical load controller, wherein the microprocessor is configured to detect the zero-crossings (i) at the negative-going transitions and ignore the positive-going transitions of the AC waveform, or (ii) at the positive-going transitions and ignore the negative-going transitions of the AC waveform.

A12. The method of A1, further comprising repeatedly performing, across a duration of time during which the electrical load controller is turned on to selectively control the switching circuit to conduct the AC power to the load: the detecting zero-crossings, the determining a plurality of periods of full cycles, the determining a frequency of the AC waveform, and the controlling power to the load based on the determining frequency.

A13. An electrical load controller for controlling conduction of a supply of alternating current (AC) power to a load, the supply of AC power having an AC waveform, the AC waveform oscillating though full cycles, each full cycle comprising a positive half cycle and a negative half cycle of the AC waveform, the electrical load controller comprising: a line input terminal and a load output terminal, the line input terminal configured to be electrically coupled to a supply of AC power, and the load output terminal configured to be electrically coupled to a load; a switching circuit electrically coupled in series between the line input terminal and the load output terminal, the switching circuit having an ON state in which the switching circuit conducts the supply of AC power to the load, and an OFF state in which the switching circuit does not conduct the supply of AC power to the load; and a controller, the controller configured to perform a method comprising: detecting zero-crossings of the AC waveform; determining, using the detected zero-crossings, a plurality of periods, each period corresponding to a full cycle of the AC waveform; determining a frequency of the AC waveform based on the determined plurality of periods of the full cycles of the AC waveform; and controlling the supply of AC power to the load based on the determined frequency of the AC waveform, wherein the controlling uses the determined frequency to fire the switching circuit of the electrical load controller in a plurality of half cycles of the AC waveform to selectively control the switching circuit to conduct the AC power to the load.

A14. The electrical load controller of A13, wherein the full cycles are consecutive full cycles of the AC waveform.

A15. The electrical load controller of A13, wherein the determined periods are a fixed number of periods of a plurality of most recent full cycles of the AC waveform.

A16. The electrical load controller of A13, wherein the determined frequency of the AC waveform is determined from a median value of the determined periods.

A17. The electrical load controller of A13, wherein the determined frequency of the AC waveform is determined from an average of the determined periods.

A18. The electrical load controller of A13, wherein the controlling comprises: using the determined frequency to determine a half cycle time of the AC waveform; and determining, from the half cycle time, points of the AC waveform when the AC power to the load is to be switched on or off.

A19. The electrical load controller of A13, wherein the method further comprises: determining an expected time of an upcoming zero-crossing of the AC waveform that transitions from a first full cycle to a second full cycle, the determining the expected time comprising adding a calculated period of the determined frequency to a time of a most-recently detected zero-crossing; based on the expected time of the upcoming zero-crossing, setting a window of time during which a zero-crossing indication of a zero-crossing signal of the electrical load controller is taken as being valid, wherein one or more zero-crossing indications, of the zero-crossing signal, occurring prior to the window of time are ignored.

A20. The electrical load controller of A19, wherein the window extends from a defined amount of time before the expected time of the zero-crossing to a defined amount of time after the expected time of the zero-crossing.

A21. The electrical load controller of A13, wherein the detected zero-crossings of the AC waveform are detected from either: (i) transitions from a HI state of a zero-crossing signal to a LOW state of the zero-crossing signal, wherein transitions of the zero-crossing signal from the LOW state to the HI state are ignored or discarded; or (ii) transitions from a LOW state of a zero-crossing signal to a HI state of the zero-crossing signal, wherein transitions of the zero-crossing signal from the HI state to the LOW state are ignored or discarded.

A22. The electrical load controller of A13, wherein the detected zero-crossings of the AC waveform all occur at either negative-going transitions or positive-going transitions of the AC waveform.

A23. The electrical load controller of A22, wherein the detecting the zero-crossings is by receiving an input by a microprocessor of the electrical load controller, wherein the microprocessor is configured to detect the zero-crossings (i) at the negative-going transitions and ignore the positive-going transitions of the AC waveform, or (ii) at the positive-going transitions and ignore the negative-going transitions of the AC waveform.

A24. The electrical load controller of A13, wherein the method further comprises repeatedly performing, across a duration of time during which the electrical load controller is turned on to selectively control the switching circuit to conduct the AC power to the load: the detecting zero-crossings, the determining a plurality of periods of full cycles, the determining a frequency of the AC waveform, and the controlling power to the load based on the determining frequency.

A25. A computer program product for operating an electrical load controller, the computer program product comprising: a computer readable storage medium readable by a processing circuit and storing instructions for execution by the processing circuit to perform a method comprising: detecting zero-crossings of an alternating current (AC) waveform of a supply of AC power, the AC waveform oscillating though full cycles, each full cycle comprising a positive half cycle and a negative half cycle of the AC waveform; determining, using the detected zero-crossings, a plurality of periods, each period corresponding to a full cycle of the AC waveform; determining a frequency of the AC waveform based on the determined plurality of periods of the full cycles of the AC waveform; and controlling a supply of AC power to a load based on the determined frequency of the AC waveform, wherein the controlling uses the determined frequency to fire a switching circuit of the electrical load controller in a plurality of half cycles of the AC waveform to selectively control the switching circuit to conduct the AC power to the load.

A26. The computer program product of A25, wherein the full cycles are consecutive full cycles of the AC waveform.

A27. The computer program product of A25, wherein the determined periods are a fixed number of periods of a plurality of most recent full cycles of the AC waveform.

A28. The computer program product of A25, wherein the determined frequency of the AC waveform is determined from a median value of the determined periods.

A29. The computer program product of A25, wherein the determined frequency of the AC waveform is determined from an average of the determined periods.

A30. The computer program product of A25, wherein the controlling comprises: using the determined frequency to determine a half cycle time of the AC waveform; and determining, from the half cycle time, points of the AC waveform when the AC power to the load is to be switched on or off.

A31. The computer program product of A25, wherein the method further comprises: determining an expected time of an upcoming zero-crossing of the AC waveform that transitions from a first full cycle to a second full cycle, the determining the expected time comprising adding a calculated period of the determined frequency to a time of a most-recently detected zero-crossing; based on the expected time of the upcoming zero-crossing, setting a window of time during which a zero-crossing indication of a zero-crossing signal of the electrical load controller is taken as being valid, wherein one or more zero-crossing indications, of the zero-crossing signal, occurring prior to the window of time are ignored.

A32. The computer program product of A31, wherein the window extends from a defined amount of time before the expected time of the zero-crossing to a defined amount of time after the expected time of the zero-crossing.

A33. The computer program product of A25, wherein the detected zero-crossings of the AC waveform are detected from either: (i) transitions from a HI state of a zero-crossing signal to a LOW state of the zero-crossing signal, wherein transitions of the zero-crossing signal from the LOW state to the HI state are ignored or discarded; or (ii) transitions from a LOW state of a zero-crossing signal to a HI state of the zero-crossing signal, wherein transitions of the zero-crossing signal from the HI state to the LOW state are ignored or discarded.

A34. The computer program product of A25, wherein the detected zero-crossings of the AC waveform all occur at either negative-going transitions or positive-going transitions of the AC waveform.

A35. The computer program product of A34, wherein the detecting the zero-crossings is by receiving an input by a microprocessor of the electrical load controller, wherein the microprocessor is configured to detect the zero-crossings (i) at the negative-going transitions and ignore the positive-going transitions of the AC waveform, or (ii) at the positive-going transitions and ignore the negative-going transitions of the AC waveform.

A36. The computer program product of A25, wherein the method further comprises repeatedly performing, across a duration of time during which the electrical load controller is turned on to selectively control the switching circuit to conduct the AC power to the load: the detecting zero-crossings, the determining a plurality of periods of full cycles, the determining a frequency of the AC waveform, and the controlling power to the load based on the determining frequency.

B1. A method comprising: maintaining a minimum on-time for which a control signal to a switching circuit of an electrical load controller is to remain in an ON state to fire the switching circuit, the electrical load controller comprising a line input terminal and a load output terminal, the line input terminal configured to be electrically coupled to a supply of alternating current (AC) power, and the load output terminal configured to be electrically coupled to a load, wherein the switching circuit is electrically coupled in series between the line input terminal and the load output terminal, and the switching circuit is configured to be selectively controlled by varying the control signal between the ON state, in which the switching circuit conducts the supply of AC power to the load, and an OFF state; based on a desired load level setting of the electrical load controller, setting a corresponding control signal turn-on time to turn the control signal to the ON state to conduct the supply of AC power to the load, the control signal turn-on time corresponding to a firing angle, the firing angle being a first angle of half cycles of the AC power; selecting a control signal turn-off time to turn the control signal to the OFF state, wherein the selecting is made between (i) a first turn-off time equal to the set turn-on time plus the minimum on-time, and (ii) a second turn-off time equal to a default turn-off time for turning the control signal to the OFF state, the control signal turn-off time corresponding to a second angle of half cycles of the AC power; and controlling the supply of AC power to the load by selectively controlling the switching circuit to conduct the supply of AC power to the load, the controlling the supply of AC power to the load comprising: based on turning the control signal to the ON state during a half cycle of the AC power at the set control signal turn-on time, holding the control signal in the ON state until the selected control signal turn-off time during the half cycle.

B2. The method of B1, further comprising determining the first turn-off time and the second turn-off time, wherein the selecting selects, as the control signal turn-off time, a later of the first turn-off time and the second turn-off time.

B3. The method of B1, wherein based on the first turn-off time being later than the second turn-off time and on selecting the first turn-off time to be the control signal turn-off time, the method further comprises: receiving from a user an indication of a problem with the load after turning the control signal to the ON state at the set control signal turn-on time and holding the control signal in the ON state until the first turn-off time; and setting a latest control signal turn-on time for turning the control signal to the ON state, the latest control signal turn-on time being set to a time prior to the set control signal turn-on time.

B4. The method of B3, wherein the electrical load controller is a dimmer, wherein the load is a lighting load, and wherein the receiving and the setting are performed to establish a minimum available brightness to which to dim the lighting load.

B5. The method of B1, wherein based on a user changing the desired load level setting of the electrical load controller, the method further comprises repeating the (i) setting the corresponding control signal turn-on time, (ii) the selecting a control signal turn-off time, and the (iii) holding the control signal in the ON state until the selected control signal turn-off time.

B6. An electrical load controller comprising: a line input terminal and a load output terminal, the line input terminal configured to be electrically coupled to a supply of AC power to a load, and the load output terminal configured to be electrically coupled to the load; a switching circuit electrically coupled in series between the line input terminal and the load output terminal, the switching circuit configured to be selectively controlled by varying a control signal to the switching circuit between an ON state in which the switching circuit conducts the supply of AC power to the load, and an OFF state; and a controller, the controller configured to perform a method comprising: maintaining a minimum on-time for which the control signal to the switching circuit is to remain in the ON state to fire the switching circuit; based on a desired load level setting of the electrical load controller, setting a corresponding control signal turn-on time to turn the control signal to the ON state to conduct the supply of AC power to the load, the control signal turn-on time corresponding to a firing angle, the firing angle being a first angle of half cycles of the AC power; selecting a control signal turn-off time to turn the control signal to the OFF state, wherein the selecting is made between (i) a first turn-off time equal to the set turn-on time plus the minimum on-time, and (ii) a second turn-off time equal to a default turn-off time for turning the control signal to the OFF state, the control signal turn-off time corresponding to a second angle of half cycles of the AC power; and controlling the supply of AC power to the load by selectively controlling the switching circuit to conduct the supply of AC power to the load, the controlling the supply of AC power to the load comprising: based on turning the control signal to the ON state during a half cycle of the AC power at the set control signal turn-on time, holding the control signal in the ON state until the selected control signal turn-off time during the half cycle.

B7. The electrical load controller of B6, wherein the method further comprises determining the first turn-off time and the second turn-off time, wherein the selecting selects, as the control signal turn-off time, a later of the first turn-off time and the second turn-off time.

B8. The electrical load controller of B6, wherein based on the first turn-off time being later than the second turn-off time and on selecting the first turn-off time to be the control signal turn-off time, the method further comprises: receiving from a user an indication of a problem with the load after turning the control signal to the ON state at the set control signal turn-on time and holding the control signal in the ON state until the first turn-off time; and setting a latest control signal turn-on time for turning the control signal to the ON state, the latest control signal turn-on time being set to a time prior to the set control signal turn-on time.

B9. The electrical load controller of B8, wherein the electrical load controller is a dimmer, wherein the load is a lighting load, and wherein the receiving and the setting are performed to establish a minimum available brightness to which to dim the lighting load.

B10. The electrical load controller of B6, wherein based on a user changing the desired load level setting of the electrical load controller, the method further comprises repeating the (i) setting the corresponding control signal turn-on time, (ii) the selecting a control signal turn-off time, and the (iii) holding the control signal in the ON state until the selected control signal turn-off time.

B11. A computer program product comprising: a computer readable storage medium readable by a processing circuit and storing instructions for execution by the processing circuit to perform a method comprising: maintaining a minimum on-time for which a control signal to a switching circuit of an electrical load controller is to remain in an ON state to fire the switching circuit, the electrical load controller comprising a line input terminal and a load output terminal, the line input terminal configured to be electrically coupled to a supply of alternating current (AC) power, and the load output terminal configured to be electrically coupled to a load, wherein the switching circuit is electrically coupled in series between the line input terminal and the load output terminal, and the switching circuit is configured to be selectively controlled by varying the control signal between the ON state, in which the switching circuit conducts the supply of AC power to the load, and an OFF state; based on a desired load level setting of the electrical load controller, setting a corresponding control signal turn-on time to turn the control signal to the ON state to conduct the supply of AC power to the load, the control signal turn-on time corresponding to a firing angle, the firing angle being a first angle of half cycles of the AC power; selecting a control signal turn-off time to turn the control signal to the OFF state, wherein the selecting is made between (i) a first turn-off time equal to the set turn-on time plus the minimum on-time, and (ii) a second turn-off time equal to a default turn-off time for turning the control signal to the OFF state, the control signal turn-off time corresponding to a second angle of half cycles of the AC power; and controlling the supply of AC power to the load by selectively controlling the switching circuit to conduct the supply of AC power to the load, the controlling the supply of AC power to the load comprising: based on turning the control signal to the ON state during a half cycle of the AC power at the set control signal turn-on time, holding the control signal in the ON state until the selected control signal turn-off time during the half cycle.

B12. The computer program product of B11, wherein the method further comprises determining the first turn-off time and the second turn-off time, wherein the selecting selects, as the control signal turn-off time, a later of the first turn-off time and the second turn-off time.

B13. The computer program product of B11, wherein based on the first turn-off time being later than the second turn-off time and on selecting the first turn-off time to be the control signal turn-off time, the method further comprises: receiving from a user an indication of a problem with the load after turning the control signal to the ON state at the set control signal turn-on time and holding the control signal in the ON state until the first turn-off time; and setting a latest control signal turn-on time for turning the control signal to the ON state, the latest control signal turn-on time being set to a time prior to the set control signal turn-on time.

B14. The computer program product of B13, wherein the electrical load controller is a dimmer, wherein the load is a lighting load, and wherein the receiving and the setting are performed to establish a minimum available brightness to which to dim the lighting load.

B15. The computer program product of B11, wherein based on a user changing the desired load level setting of the electrical load controller, the method further comprises repeating the (i) setting the corresponding control signal turn-on time, (ii) the selecting a control signal turn-off time, and the (iii) holding the control signal in the ON state until the selected control signal turn-off time.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A method of operating an electrical load controller, the method comprising:
    detecting zero-crossings of an alternating current (AC) waveform of a supply of AC power, the AC waveform oscillating though full cycles, each full cycle comprising a positive half cycle and a negative half cycle of the AC waveform;
    determining, using the detected zero-crossings, a plurality of periods, each period corresponding to a full cycle of the AC waveform, wherein the determined periods are a fixed number of periods of a plurality of most recent full cycles of the AC waveform;
    determining a frequency of the AC waveform based on the determined plurality of periods of the full cycles of the AC waveform; and
    controlling a supply of AC power to a load based on the determined frequency of the AC waveform, wherein the controlling uses the determined frequency to fire a switching circuit of the electrical load controller in a plurality of half cycles of the AC waveform to selectively control the switching circuit to conduct the AC power to the load.

2. The method of claim 1, wherein the full cycles are consecutive full cycles of the AC waveform.

3. The method of claim 1, wherein the determined frequency of the AC waveform is determined from one selected from the group consisting of:
    a median value of the determined periods; and
    an average of the determined periods.

4. The method of claim 1, wherein the controlling comprises:
    using the determined frequency to determine a half cycle time of the AC waveform; and
    determining, from the half cycle time, points of the AC waveform when the AC power to the load is to be switched on or off.

5. The method of claim 1, wherein the detected zero-crossings of the AC waveform are detected from either:
    (i) transitions from a HI state of a zero-crossing signal to a LOW state of the zero-crossing signal, wherein transitions of the zero-crossing signal from the LOW state to the HI state are ignored or discarded; or
    (ii) transitions from a LOW state of a zero-crossing signal to a HI state of the zero-crossing signal, wherein transitions of the zero-crossing signal from the HI state to the LOW state are ignored or discarded.

6. The method of claim 1, wherein the detected zero-crossings of the AC waveform all occur at either negative-going transitions or positive-going transitions of the AC waveform, wherein the detecting the zero-crossings is by receiving an input by a microprocessor of the electrical load controller, and wherein the microprocessor is configured to detect the zero-crossings (i) at the negative-going transitions and ignore the positive-going transitions of the AC waveform, or (ii) at the positive-going transitions and ignore the negative-going transitions of the AC waveform.

7. The method of claim 1, further comprising repeatedly performing, across a duration of time during which the electrical load controller is turned on to selectively control the switching circuit to conduct the AC power to the load: the detecting zero-crossings, the determining a plurality of periods of full cycles, the determining a frequency of the AC waveform, and the controlling power to the load based on the determining frequency.

8. An electrical load controller for controlling conduction of a supply of alternating current (AC) power to a load, the supply of AC power having an AC waveform, the AC waveform oscillating though full cycles, each full cycle comprising a positive half cycle and a negative half cycle of the AC waveform, the electrical load controller comprising:
 a line input terminal and a load output terminal, the line input terminal configured to be electrically coupled to a supply of AC power, and the load output terminal configured to be electrically coupled to a load;
 a switching circuit electrically coupled in series between the line input terminal and the load output terminal, the switching circuit having an ON state in which the switching circuit conducts the supply of AC power to the load, and an OFF state in which the switching circuit does not conduct the supply of AC power to the load; and
 a controller, the controller configured to perform a method comprising:
  detecting zero-crossings of the AC waveform;
  determining, using the detected zero-crossings, a plurality of periods, each period corresponding to a full cycle of the AC waveform, wherein the determined periods are a fixed number of periods of a plurality of most recent full cycles of the AC waveform;
  determining a frequency of the AC waveform based on the determined plurality of periods of the full cycles of the AC waveform; and
  controlling the supply of AC power to the load based on the determined frequency of the AC waveform, wherein the controlling uses the determined frequency to fire the switching circuit of the electrical load controller in a plurality of half cycles of the AC waveform to selectively control the switching circuit to conduct the AC power to the load.

9. The electrical load controller of claim 8, wherein the full cycles are consecutive full cycles of the AC waveform.

10. The electrical load controller of claim 8, wherein the determined frequency of the AC waveform is determined from one selected from the group consisting of:
 a median value of the determined periods; and
 an average of the determined periods.

11. The electrical load controller of claim 8, wherein the controlling comprises:
 using the determined frequency to determine a half cycle time of the AC waveform; and
 determining from the half cycle time, points of the AC waveform when the AC power to the load is to be switched on or off.

12. The electrical load controller of claim 8, wherein the detected zero-crossings of the AC waveform are detected from either:
 (i) transitions from a HI state of a zero-crossing signal to a LOW state of the zero-crossing signal, wherein transitions of the zero-crossing signal from the LOW state to the HI state are ignored or discarded; or
 (ii) transitions from a LOW state of a zero-crossing signal to a HI state of the zero-crossing signal, wherein transitions of the zero-crossing signal from the HI state to the LOW state are ignored or discarded.

13. The electrical load controller of claim 8, wherein the detected zero-crossings of the AC waveform all occur at either negative-going transitions or positive-going transitions of the AC waveform, wherein the detecting the zero-crossings is by receiving an input by a microprocessor of the electrical load controller, and wherein the microprocessor is configured to detect the zero-crossings (i) at the negative-going transitions and ignore the positive-going transitions of the AC waveform, or (ii) at the positive-going transitions and ignore the negative-going transitions of the AC waveform.

14. The electrical load controller of claim 8, wherein the method further comprises repeatedly performing, across a duration of time during which the electrical load controller is turned on to selectively control the switching circuit to conduct the AC power to the load: the detecting zero-crossings, the determining a plurality of periods of full cycles, the determining a frequency of the AC waveform, and the controlling power to the load based on the determining frequency.

15. A method of operating an electrical load controller, the method comprising:
 detecting, by receiving an input by a microprocessor of the electrical load controller, zero-crossings of an alternating current (AC) waveform of a supply of AC power, the AC waveform oscillating though full cycles, each full cycle comprising a positive half cycle and a negative half cycle of the AC waveform, wherein the detected zero-crossings of the AC waveform all occur at either negative-going transitions or positive-going transitions of the AC waveform, and wherein the microprocessor is configured to detect the zero-crossings (i) at the negative-going transitions and ignore the positive-going transitions of the AC waveform, or (ii) at the positive-going transitions and ignore the negative-going transitions of the AC waveform;
 determining, using the detected zero-crossings, a plurality of periods, each period corresponding to a full cycle of the AC waveform;
 determining a frequency of the AC waveform based on the determined plurality of periods of the full cycles of the AC waveform; and
 controlling a supply of AC power to a load based on the determined frequency of the AC waveform, wherein the controlling uses the determined frequency to fire a switching circuit of the electrical load controller in a plurality of half cycles of the AC waveform to selectively control the switching circuit to conduct the AC power to the load.

16. The method of claim 15, wherein the full cycles are consecutive full cycles of the AC waveform.

17. The method of claim 15, wherein the determined frequency of the AC waveform is determined from one selected from the group consisting of:
 a median value of the determined periods; and
 an average of the determined periods.

18. The method of claim 15, wherein the controlling comprises:
- using the determined frequency to determine a half cycle time of the AC waveform; and
- determining, from the half cycle time, points of the AC waveform when the AC power to the load is to be switched on or off.

19. The method of claim 15, wherein the detected zero-crossings of the AC waveform are detected from either:
  (i) transitions from a HI state of a zero-crossing signal to a LOW state of the zero-crossing signal, wherein transitions of the zero-crossing signal from the LOW state to the HI state are ignored or discarded; or
  (ii) transitions from a LOW state of a zero-crossing signal to a HI state of the zero-crossing signal, wherein transitions of the zero-crossing signal from the HI state to the LOW state are ignored or discarded.

20. The method of claim 15, further comprising repeatedly performing, across a duration of time during which the electrical load controller is turned on to selectively control the switching circuit to conduct the AC power to the load: the detecting zero-crossings, the determining a plurality of periods of full cycles, the determining a frequency of the AC waveform, and the controlling power to the load based on the determining frequency.

* * * * *